US012163828B2

(12) United States Patent
Kochar

(10) Patent No.: US 12,163,828 B2
(45) Date of Patent: Dec. 10, 2024

(54) METHODS AND DEVICES FOR OBTAINING SILICON PHOTOMULTIPLIER DATA

(71) Applicant: Meso Scale Technologies, LLC., Rockville, MD (US)

(72) Inventor: Manish Kochar, Rockville, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 0 days.

(21) Appl. No.: 18/308,915

(22) Filed: Apr. 28, 2023

(65) Prior Publication Data

US 2023/0375402 A1   Nov. 23, 2023

Related U.S. Application Data

(60) Provisional application No. 63/336,822, filed on Apr. 29, 2022.

(51) Int. Cl.
*G01J 1/44* (2006.01)
*G01N 21/64* (2006.01)
*G01N 21/76* (2006.01)

(52) U.S. Cl.
CPC .......... *G01J 1/44* (2013.01); *G01J 2001/444* (2013.01); *G01J 2001/4466* (2013.01); *G01J 2001/448* (2013.01); *G01N 21/6428* (2013.01); *G01N 21/6452* (2013.01); *G01N 21/76* (2013.01)

(58) Field of Classification Search
CPC ................. G01J 1/44; G01J 2001/444; G01J 2001/4466; G01J 2001/448; G01J 1/0252; G01N 21/6428; G01N 21/6452; G01N 21/76
See application file for complete search history.

(56) References Cited

U.S. PATENT DOCUMENTS

| | | | | |
|---|---|---|---|---|
| 2004/0239922 | A1* | 12/2004 | Modlin | G01N 21/6428 356/317 |
| 2013/0022077 | A1* | 1/2013 | Harmon | G01J 5/024 374/178 |
| 2014/0052299 | A1* | 2/2014 | Suzuki | E02F 9/267 700/275 |
| 2018/0266881 | A1* | 9/2018 | Fujiwara | H01L 27/1443 |
| 2020/0243413 | A1* | 7/2020 | Davidovic | G01J 1/44 |

(Continued)

OTHER PUBLICATIONS

Francesco Licciulli et al: "A Novel Technique for the Stabilization of SiPM Gain Against Temperature Variations", IEEE Transactions of Nuclear Science, IEEE, USA, vol. 60, No. 2, Apr. 1, 2013, pp. 606-611, XP011499798, ISSN: 0018-9499, DOI: 10.1109/TNS.2013-2249527.

(Continued)

*Primary Examiner* — Thanh Luu
*Assistant Examiner* — Monica T Taba
(74) *Attorney, Agent, or Firm* — MEDLER FERRO WOODHOUSE & MILLS PLLC

(57) ABSTRACT

Systems and methods for improving assay results obtained by silicon photomultiplier devices are provided. Systems may include assay devices including silicon photomultiplier devices and computing systems. Systems may further include processing components and storage units configured for receiving silicon photomultiplier device input and output information and for determining silicon photomultiplier device temperatures.

26 Claims, 16 Drawing Sheets

(56) References Cited

U.S. PATENT DOCUMENTS

2022/0337770 A1* 10/2022 Judkins, III ......... H04N 25/709

OTHER PUBLICATIONS

Kerr Emily et al: A Comparison of Commercially Available Screen-Printed Electrodes for Electrogenerated Chemiluminescence Applications:, Frontiers in Chemistry, vol. 8, Jan. 28, 2021, XP093063704, DOI: 10.3389/fchem.2020.628483 Retrieved from the Internet: URL: https://www.ncbi.nlm.nih.gov/pmc/articles/PMC7875866/pdf/fchem-08-628483.pdf , p. 2, col. 2.
Marrocchesi P S et al: "Active control of the gain of a 3mmx3mm Silicon PhotoMultiplier", Nuclear Instruments & Methods in Physics Research. Section A, Elsevier BV North-Holland, NL, vol. 602, No. 2, Apr. 21, 2009, pp. 391-395, XP026080418, ISSN: 0168-9002, DOI: 10.1016/J.NIMA.2008.12.199; section 6 "active control of the gain".

* cited by examiner

METHODS AND DEVICES FOR OBTAINING SILICON PHOTOMULTIPLIER DATA

RELATED APPLICATIONS

This application claims priority to U.S. Provisional Application No. 63/336,822, filed Apr. 29, 2022 and entitled "METHODS AND DEVICES FOR OBTAINING SILICON PHOTOMULTIPLIER DATA," which is incorporated by reference herein.

FIELD OF THE INVENTION

The present disclosure is related to methods and systems employing silicon photomultipliers. In particular, the present disclosure relates to methods and systems employing improved methods for addressing the effect of device temperature changes on silicon photomultiplier's performance. The invention is also related to assay systems and devices incorporating these improvements.

BACKGROUND

Silicon photomultiplier (SiPM) devices are highly sensitive light detectors that are used in a variety of applications involving the measurement of low light levels. For example, SiPMs may be employed as photo detectors in assay devices and systems, LIDAR units, 3-D ranging devices, radiation detection units, PET devices, turbidimetry devices, nephelometry devices, air quality analysis devices, particle analysis devices, photon correlation spectroscopy devices, Raman spectroscopy devices, and any other device that relies on precise detection of incident light. SiPMs, however, have certain limitations. The output gain of SiPM devices may be affected by or depend on their operating voltage and temperature. With respect to temperature, the gain at a fixed operating voltage can vary by as much as 1%-2% per ° C. under typical operating conditions. This may give rise to inaccuracies in the use of SiPMs for light detection in precision applications. What is needed, therefore, are methods and devices for improving SiPM performance by addressing and accounting for SiPM temperature changes.

SUMMARY

An embodiment as disclosed herein includes a method for obtaining temperature corrected photometric data by a silicon photomultiplier device, the method comprising: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

A further embodiment as disclosed herein includes a method for obtaining temperature corrected photometric data by a silicon photomultiplier device, the method comprising: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

A further embodiment as disclosed herein includes a method for obtaining temperature corrected photometric data by a silicon photomultiplier device, the method comprising: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

A further embodiment as disclosed herein includes a method for determining a temperature of a silicon photomultiplier device, the method comprising: activating the silicon photomultiplier device in a reverse bias mode by a reverse bias input signal; exposing the silicon photomultiplier device to a predetermined light intensity; measuring a reverse bias output signal from the silicon photomultiplier device; determining a gain of the silicon photomultiplier device according to the reverse bias input signal, the reverse bias output signal, and the predetermined light intensity when exposed to the predetermined light intensity; and determining the temperature of the silicon photomultiplier device according to the gain.

A further embodiment as disclosed herein includes a system for obtaining temperature corrected photometric data, the system comprising: a silicon photomultiplier device including a plurality of photo-avalanche diodes; and at least one processor configured with software instructions for: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

A further embodiment as disclosed herein includes a system for obtaining temperature corrected photometric data, the system comprising: a silicon photomultiplier device including a plurality of photo-avalanche diodes; and at least one processor configured with software instructions for: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

A further embodiment as disclosed herein includes a system for obtaining temperature corrected photometric data, the system comprising: a silicon photomultiplier device including a plurality of photo-avalanche diodes; and at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

A further embodiment as disclosed herein includes a system for obtaining temperature corrected photometric data, the system comprising: a silicon photomultiplier device including a plurality of photo-avalanche diodes; and at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a gain of the silicon photomultiplier device according to the reverse bias input signal, the reverse bias output signal, and the predetermined light intensity when exposed to the predetermined light intensity; and determining the temperature of the silicon photomultiplier device according to the gain.

A further embodiment as disclosed herein includes a non-transitory computer-readable medium configured with software instructions to cause execution of a method by at least one processor, the method comprising: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

A further embodiment as disclosed herein includes a non-transitory computer-readable medium configured with software instructions to cause execution of a method by at least one processor, the method comprising: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

A further embodiment as disclosed herein includes a non-transitory computer-readable medium configured with software instructions to cause execution of a method by at least one processor, the method comprising: a silicon photomultiplier device including a plurality of photo-avalanche diodes; at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

DETAILED DESCRIPTION OF THE INVENTION

The present disclosure provides systems and computer implemented methods of determining and accounting for temperatures in assay devices and other equipment employing a silicon photomultiplier device. As discussed herein, the temperature determination systems, devices, and methods may be employed to improve the accuracy and speed with which light detection assay steps are performed. The temperature determination methods, devices, and systems as discussed herein may be applied to various systems and devices that incorporate SiPM devices and/or avalanche photodiodes and that require temperature compensation for optimal performance. Such devices may include, for example, assay devices and systems, LIDAR units, 3-D ranging devices, radiation detection units, PET devices, turbidimetry devices, nephelometry devices, air quality analysis devices, particle analysis devices, photon correlation spectroscopy devices, Raman spectroscopy devices, and any other device that relies on precise detection of incident light.

Figure 1:
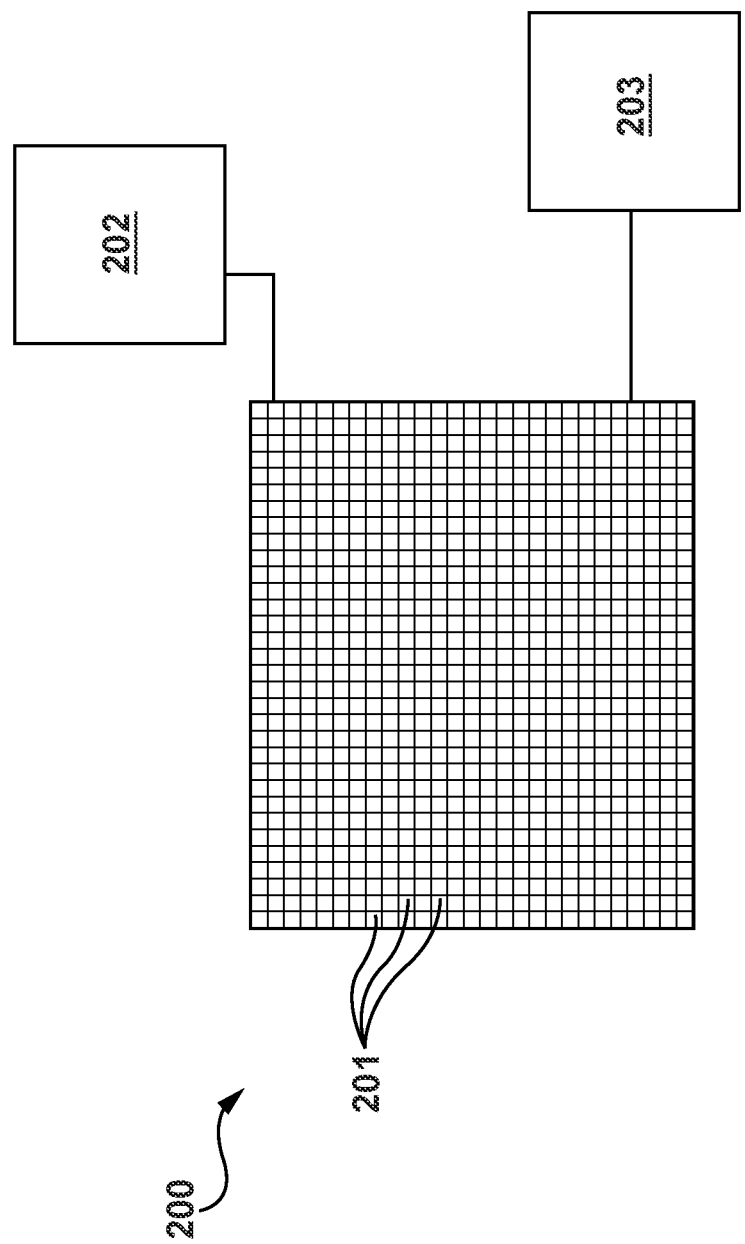
FIG. 1 illustrates an example silicon photodiode multiplier device (SiPM) consistent with embodiments hereof.

FIG. 1 illustrates an example silicon photodiode multiplier device (SiPM) 200 which may be included in any SiPM based photodetection device. The SiPM 200 includes a plurality of photo-avalanche diodes (PADs) 201, a power source 202, and an output monitor 203. The SiPM 200 may include any suitable number of PADS 201, ranging from dozens to hundreds or thousands of PADs 201, including a number of PADs 201 in excess of 10,000. The PADs 201 are arranged in an m×n or n×m array, where n and m may be equal (a square array) or not (a rectangular array). In alternative embodiments, the PADs 201 may be arranged in any other suitable arrangement, e.g., hexagonal, circular, etc. Electrically, the PADs 201 are arranged in parallel with each other in the SiPM 200.

The power source 202 is controlled, e.g., via a computer system or other control system, as discussed below, so as to generate a bias voltage across the PADs 201. The power source 202 may be a voltage source configured to provide a specific voltage bias, either forward (positive) or reverse (negative) across the PADs 201. The power source 202 may be a current source configured to provide a controlled current so as to generate a specific voltage bias, either forward (positive) or reverse (negative) across the PADs 201, or a specific current flow through the PADs 201.

The output monitor 203 is configured to measure an output of the SiPM 200 during operation. The output monitor 203 may be configured to measure a current output of the SiPM 200. In embodiments, the output monitor 203 may be configured to measure a voltage at the output of the SiPM 200 and determine a current based on the measured voltage. In some implementations, the output monitor 203 may include an amplifying circuit that is configured to amplify a voltage or current output of the SiPM 200.

Figure 2:
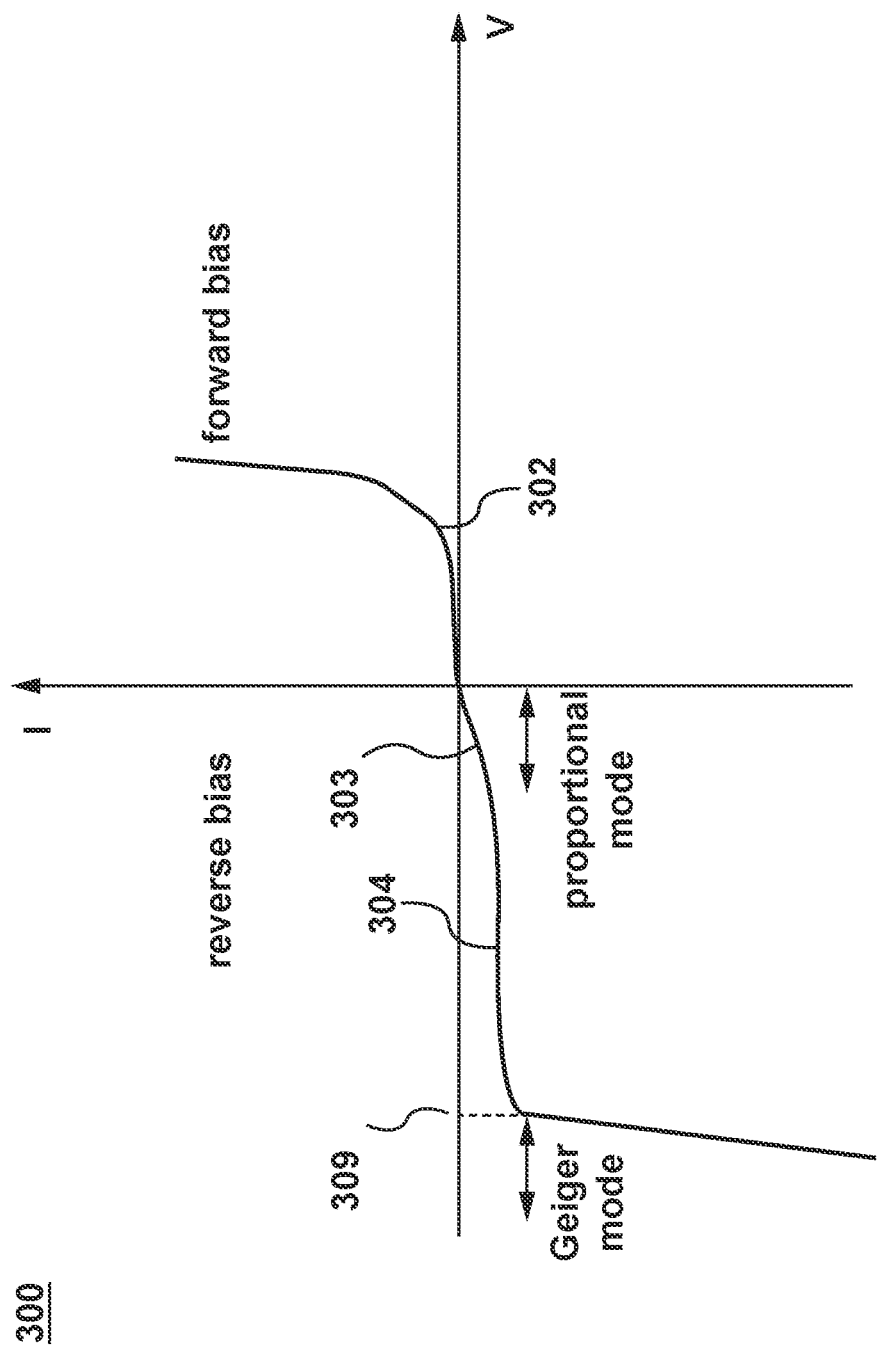
FIG. 2 is a graph illustrating example diode response consistent with embodiments hereof.

In operation, the combined action of the plurality of PADs 201 may be used to determine an amount of light, e.g., a number of photons, striking the SiPM 200. The PAD 201 is a semiconductor device based on a p-n junction. FIG. 2 is a chart 300 that illustrates a typical voltage-current response for a PAD 201. In a forward bias mode, the diode conducts little current until a threshold voltage 302 is reached. Above the threshold voltage 302 in the forward bias mode, the diode operates as a short circuit, providing very little resistance to the free flow of current. As shown in chart 300, the current through the diode increases rapidly above the threshold voltage 302. In the reverse bias mode, when subject to a negative voltage, the PAD 201 has a proportional mode 303, wherein the current conducted has an approximately proportional relationship with the reverse bias voltage. When the reverse bias voltage has a magnitude exceeding voltages associated with the proportional mode 303, the PAD 201 enters the saturation mode 304, in which the voltage may be increased without significantly increasing the current flow. Thus, in the saturation mode 304, the diode permits the flow of a saturation current approximately irrespective of the reverse bias voltage. When the reverse bias voltage is increased in magnitude past the breakdown voltage $V_{Breakdown}$ or $V_B$ 309, the PAD 201 enters a "Geiger mode." Similar to the threshold voltage 302 in forward bias mode, the breakdown voltage $V_B$ 309 is the reverse bias voltage at which the resistance of the diode decreases significantly and permits the flow of an escalated current. In the Geiger mode, a small magnitude increase in negative voltage results in a large change in current conducted.

During operation for the detection of photons, the PAD 201 is reverse-biased at a voltage having a magnitude that exceeds the junction breakdown voltage $V_{Breakaown}$. The high reverse-bias maintains the electric field in the PAD 201 high enough such that a single charge carrier injected into a depletion layer (i.e., the chargeless region at the P-N junction) of the PAD 201 may trigger an avalanche. Such an avalanche is caused by a photon striking the PAD 201. The PAD 201 absorbs the energy of the photon in the depletion layer, releasing a charge carrier, which, in turn triggers an avalanche of charge carriers causing an output current spike. Due to the drop in resistance in the PAD 201 as the current spikes, the bias voltage drops until the avalanche can no longer be sustained. Thus, the current spike, after reaching a maximum, decays back to the current level of the saturation mode 304. The magnitude of the reverse bias voltage is returned to the level required for triggering an avalanche again for a new reading. In this operational reverse bias mode, receipt of a photon triggers an avalanche that results in a single current spike for an output of the PAD 201.

Referring again to FIG. 1, the SiPM 200 operates through the combined action of the plurality of PADS 201. When a plurality of photons (or, more generally, light) strike a plurality of the PADS 201 of the SiPM 200, they cause a plurality of current spikes throughout the parallel connected PADS 201. Due to the parallel nature of the PADs 201, the collection of individual current spikes output from the multiple parallel connected PADS 201 are additively combined at the output monitor 203 and read as an analog current with a level proportional to the combined incidence of photons across all of the PADS 201 of the SiPM 200 (which may indicate luminosity/luminescence of the light, if any, striking the SiPM 200). Integrating the total output current spike over time permits the determination of the total number of output charge carriers. The proportional ratio between the number of output charge carriers and input photons is the gain of the SiPM 200. In this manner, the SiPM 200 provides a light detection device sensitive to the incidence of one or more photons and precise enough to detect a number of incident photons. As discussed above, SiPMs, such as SiPM 200, may be employed in light detection devices and systems (e.g., electrochemiluminescence, fluorescence, and chemiluminescence), LIDAR units, 3-D ranging devices, radiation detection units, PET devices, turbidimetry devices, nephelometry devices, air quality analysis devices, particle analysis devices, photon correlation spectroscopy devices, Raman spectroscopy devices, and any other device that relies on precise detection of incident light.

During operation of the SiPM 200, or any other SiPM based light detection device, the temperature of the PADS 201 of the SiPM 200 may be affected by conducting the measurements. The activation of the PADS 201 to conduct high levels of current causes a rise in temperature. The temperature rise may be proportional to or otherwise depend on the amount of current conducted and therefore the intensity of the light source being detected. Repeated and/or frequent activations cause higher levels of temperature rise. In addition, variations in ambient temperature not caused by the SiPM itself may be experienced by a SiPM in an operating environment.

Diodes, including the PADs 201 of the SiPM 200, have temperature dependent properties. For example, the gain and, therefore, the output response, of the SiPM 200 may vary according to its temperature. Because the gain and the output of the SiPM 200 is altered by its temperature, the temperature of the SiPM 200 may have to be controlled or accounted for during use to maintain greatest accuracy and precision. As discussed above, SiPMs may be employed in assay devices and systems, LIDAR units, 3-D ranging devices, radiation detection units, PET devices, turbidimetry devices, nephelometry devices, air quality analysis devices, particle analysis devices, photon correlation spectroscopy devices, Raman spectroscopy devices, and any other device that relies on precise detection of incident light. In each of these devices, systems, or detectors, temperature induced lack of accuracy may present challenges to obtain accurate and consistent measurements. Embodiments discussed herein address these temperature induced accuracy drawbacks.

In some embodiments, cooling equipment, such as fans, heat sinks, Peltier coolers, etc., may be provided within SiPM based devices to reduce temperature increases in the SiPM. The addition of cooling equipment, however, may have the drawback of creating noise and/or vibration and/or adding additional components and complexity to the system. In further embodiments, the timing of multiple captures by the SiPM may be adjusted to permit more cooling time between captures or detections so as to control temperature increases. Increasing timing between captures may, however, increase overall read times for SiPM measurements.

In further embodiments, an operating voltage of the SiPM (also referred to as a bias voltage or biasing voltage) may be adjusted to compensate for the effect of temperature on gain (e.g., the ratio between output current and an amount of incident photons) of the SiPM. As explained in greater detail below, SiPM gain is a function of overvoltage (i.e., the amount by which bias voltage exceeds breakdown voltage). Because the breakdown voltage is temperature dependent, the SiPM gain is as well. If the bias voltage remains fixed, the gain of the SiPM changes linearly with temperature because the breakdown voltage varies linearly with temperature. As the breakdown voltage varies, the overvoltage varies correspondingly. If the bias voltage is adjusted to maintain a constant overvoltage (i.e., voltage over the breakdown voltage), the gain-temperature dependence may be eliminated. In still further embodiments, the output of the SiPM may be calibrated according to the gain-temperature dependence after (or before) each capture or detection to determine the appropriate amount of incident photons by computing the temperature adjusted gain after (or before) each measurement.

Some embodiments that account for temperature may involve the use of a separate additional sensor (e.g., temperature sensor) to provide information on the temperature of the SiPM. The separate additional sensor (e.g., temperature sensor), if not integrated in the chip packaging of the SiPM, may be mounted external to the SiPM. External mounting may result in a time lag between a change in the temperature of the SiPM and its measurement by the external temperature sensor. Such lag may make timely compensation for SiPM temperature changes difficult to achieve and may cause a loss of sensor accuracy and precision. Even when internally mounted in the SiPM chip packaging, thermal lags between the SiPM PADS and the temperature sensor itself may cause a loss of sensor accuracy and precision. In further embodiments accounting for temperature, a temperature sensor may be integrated within the chip packaging of the SiPM. In still further embodiments, the SiPM may be employed as a temperature sensor to permit accounting or adjusting for SiPM temperature.

Figure 3:
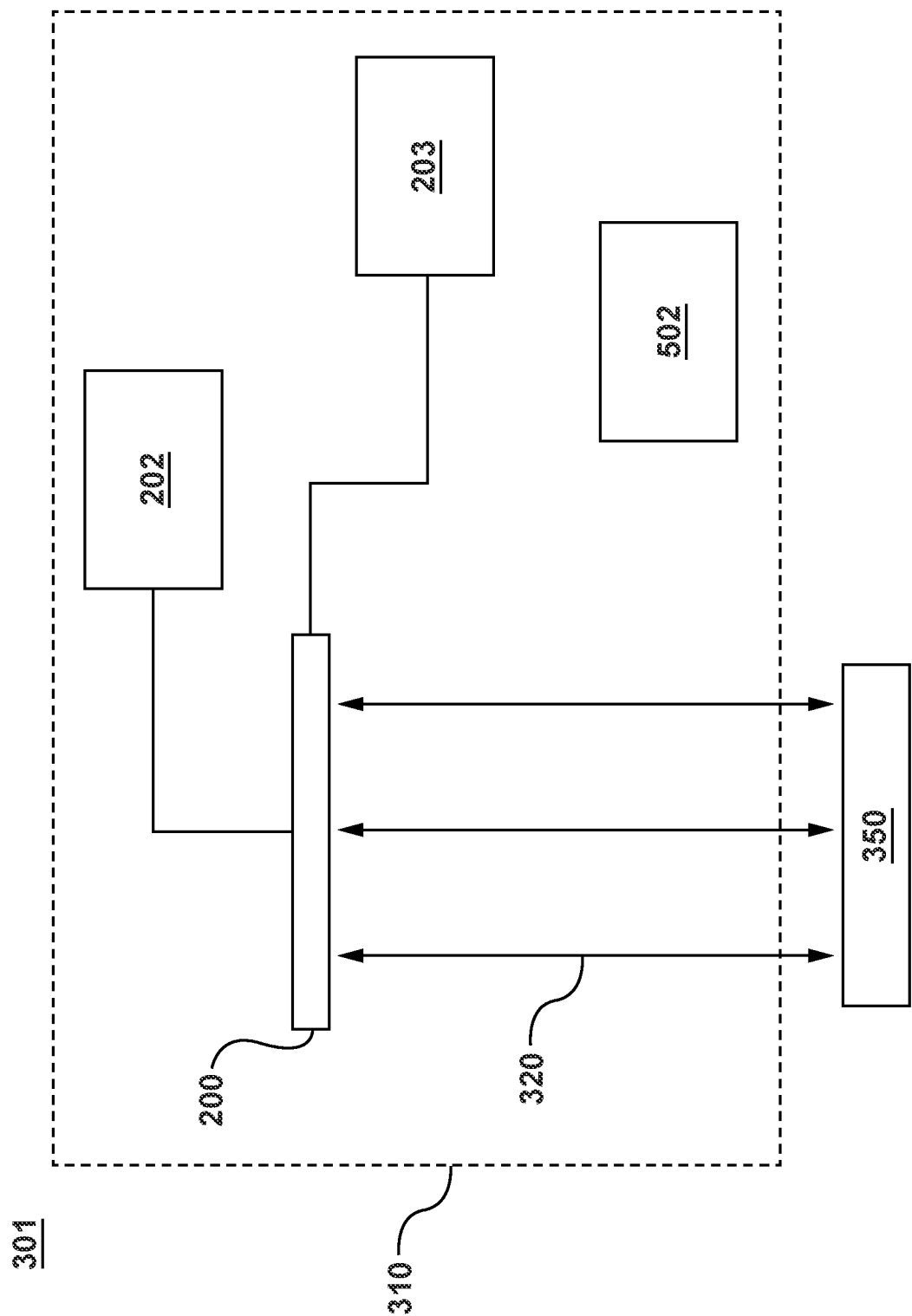
FIG. 3 illustrates an example SiPM device configured for light sensing consistent with embodiments hereof.

FIG. 3 schematically illustrates a SiPM 200 incorporated into an example light detection device 301 configured to employ the SiPM as a temperature sensor. As discussed above, the light detection device 301 may include any device configured to perform measurements through photon detection at the SiPM 200. Accordingly, the light detection device 301 may include, for example, light detection assay units (e.g., electrochemiluminescence, fluorescence, and chemiluminescence), radiation detection devices, LIDAR devices, 3-D ranging devices, low light level detectors, PET scanners, and others. The light detection unit 301 includes a housing 310, a SiPM 200 including a plurality of PADS 201 (not shown), a power source 202, and an output monitor 203. The light detection device 301 may include and/or may be connected to a computer system 502, as described in greater detail below with respect to FIG. 4.

In operation, the light detection device 301 is configured to receive photons 320 emitted from, reflected by, or otherwise traveling from a target object 350. The target object 350 may be any object, substance, etc., of which measurements are being made by the light detection device 301. The SiPM 200 is powered by the power source 202. The photons 320 strike the PADS 201 of the SiPM 200 and a measurement of the incident light intensity is made through readings made by the output monitor 203. In embodiments, the computer system 502 is configured to control various aspects of the light detection device 301, as discussed in greater detail below.

Embodiments described below with respect to FIGS. 4-10 are configured to measure SiPM temperature and/or calibrate to calibrate SiPM devices to obtain more accurate data under changing temperature conditions. Specifically, as described below with respect to FIGS. 5, 9, and 10, characteristics of a SiPM may be employed to detect or determine the temperature of the SiPM. The SiPM itself may therefore be used as a thermometer to detect its own temperature. In further embodiments, as described below with respect to FIGS. 7 and 8, temperature changes of the SiPM may be accounted for through calibration via known light sources.

Figure 4:
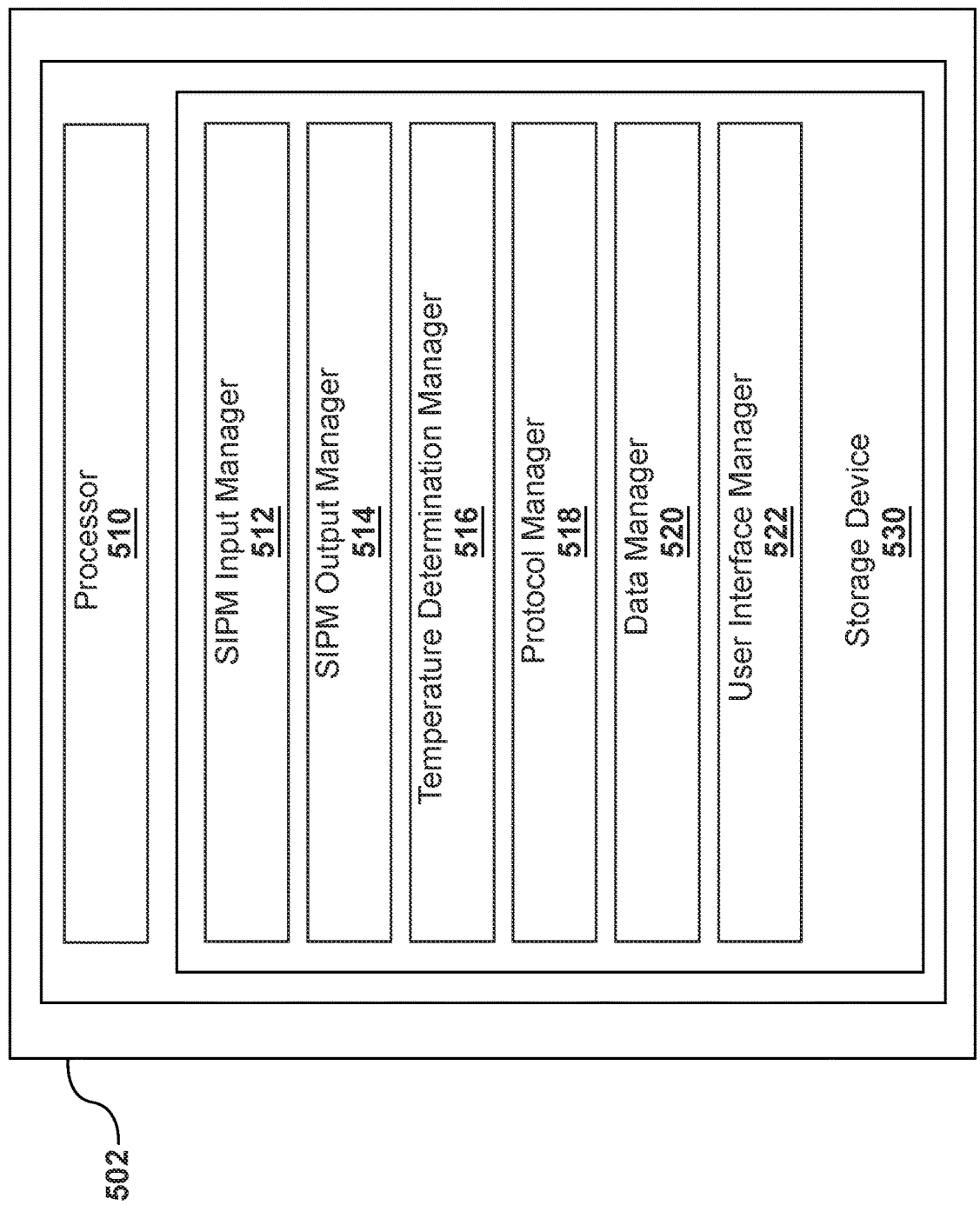
FIG. 4 illustrates an exemplary computing system consistent with embodiments hereof.

FIG. 4 illustrates an embodiment of a computer system consistent with embodiments hereof. The computing system 502 is an example of a computing system configured to operate and/or interface with SiPM based photodetection systems as discussed herein. Examples of the computing system 502 may include a server, a personal computer, a smartphone, and/or a tablet computing device. Additionally, the function of the computing systems 502 may be carried out via a cloud computing platform. In embodiments, the computing system 502 is configured with all of the necessary hardware and software to operate the various aspects of an assay system or device, such as the assay device 101 discussed below with respect to FIG. 12. The structure and functionality of the computing system 502 is discussed below with respect to an assay device such as assay device 101 and with respect to a SiPM such as SiPM 200 for example purposes only. The computing system 502 is not limited in its functionality or operation to the specific hardware discussed herein and may be employed to operate or interface with any suitable assay device or SiPM.

The computing system 502 may include one or more processors 510 (also interchangeably referred to herein as processing units 510, processors 510, processor(s) 510, or processor 510 for convenience), one or more storage device(s) 530, and/or other components. In other embodiments, the functionality of the processor may be performed by hardware (e.g., through the use of an application specific integrated circuit ("ASIC"), a programmable gate array ("PGA"), a field programmable gate array ("FPGA"), etc.), or any combination of hardware and software. The storage device 530 includes any type of non-transitory computer readable storage medium (or media) and/or non-transitory computer readable storage device. Such computer readable storage media or devices may store computer readable program instructions for causing a processor (e.g., 510) to carry out one or more methodologies described herein. Examples of the computer readable storage medium or device may include, but is not limited to an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples.

The processor 510 is programmed by one or more computer program instructions stored on the storage device 530 and executable by the processor 510. For example, the processor 510 is programmed by a SiPM input manager 512, a SiPM output manager 514, a temperature determination manager 516, a protocol manager 518, a data manager 520, and a user interface manager 522. It will be understood that the functionality of the various managers as discussed herein is representative and not limiting. As used herein, for convenience, the various "managers" will be described as performing operations, when, in fact, the managers program the processor 510 (and therefore the computing system 502) to perform the operation.

The SiPM input manager 512 is a software protocol (e.g., software module or library) that may operate on the computing system 502. The SiPM input manager 512 is configured to, e.g., interface with and provide control over the power input to the SiPM 200 of an assay device. For example, the SiPM input manager 512 may be configured to provide control over the power input (e.g., operating voltage) provided by the power source 202 to the SiPM 200. The SiPM input manager 512 is further configured to communicate with the various other managers and software protocols in operation on the computing system 502 to carry out its required functions.

The SiPM output manager 514 is a software protocol (e.g., software module or library) that may operate on the computing system 502. The SiPM output manager 514 is configured to, e.g., receive output data as measured by the output monitor 203. For example, the SiPM output manager 514 may be configured to provide control over and receive measurements from the output monitor 203. The SiPM output manager 514 is further configured to communicate with the various other managers and software protocols in operation on the computing system 502 to carry out its required functions.

The temperature determination manager 516 is a software protocol (e.g., software module or library) that may operate on the computing system 502. The temperature determination manager 516 is configured to, e.g., interact with and receive data from the SiPM input manager 512 and the SiPM output manager 514 to determine a temperature of a SiPM of an assay device. The temperature determination manager 516 is further configured to communicate with the various other managers and software protocols in operation on the computing system 502 to carry out its required functions.

The SiPM input manager 512, the SiPM output manager 514, and the temperature determination manager 516 operate in cooperation to determine SiPM temperature before, during, and/or after sample assay measurements to account for SiPM gain variations caused by temperature variations. The operation(s) and specific steps, calculations, and algorithms to determine and account for temperature of the SiPM is explained in greater detail below with respect to FIG. 5.

The protocol manager 518 is a software protocol (e.g., software module or library) that may operate on the computing system 502. The protocol manager 518 is configured to, e.g., provide one or more control signals to the light detection device 301 that is controlled by the protocol manager 518. The control signals provided by the protocol manager 518 are configured to provide instructions necessary to operate the light detection device 301. The control signals may specify one or more operations to be carried out by the light detection device 301. Control signals provided by the protocol manager 518 may be used to initiate and/or control any process that light detection devices 301 described herein is capable of.

Figure 12:
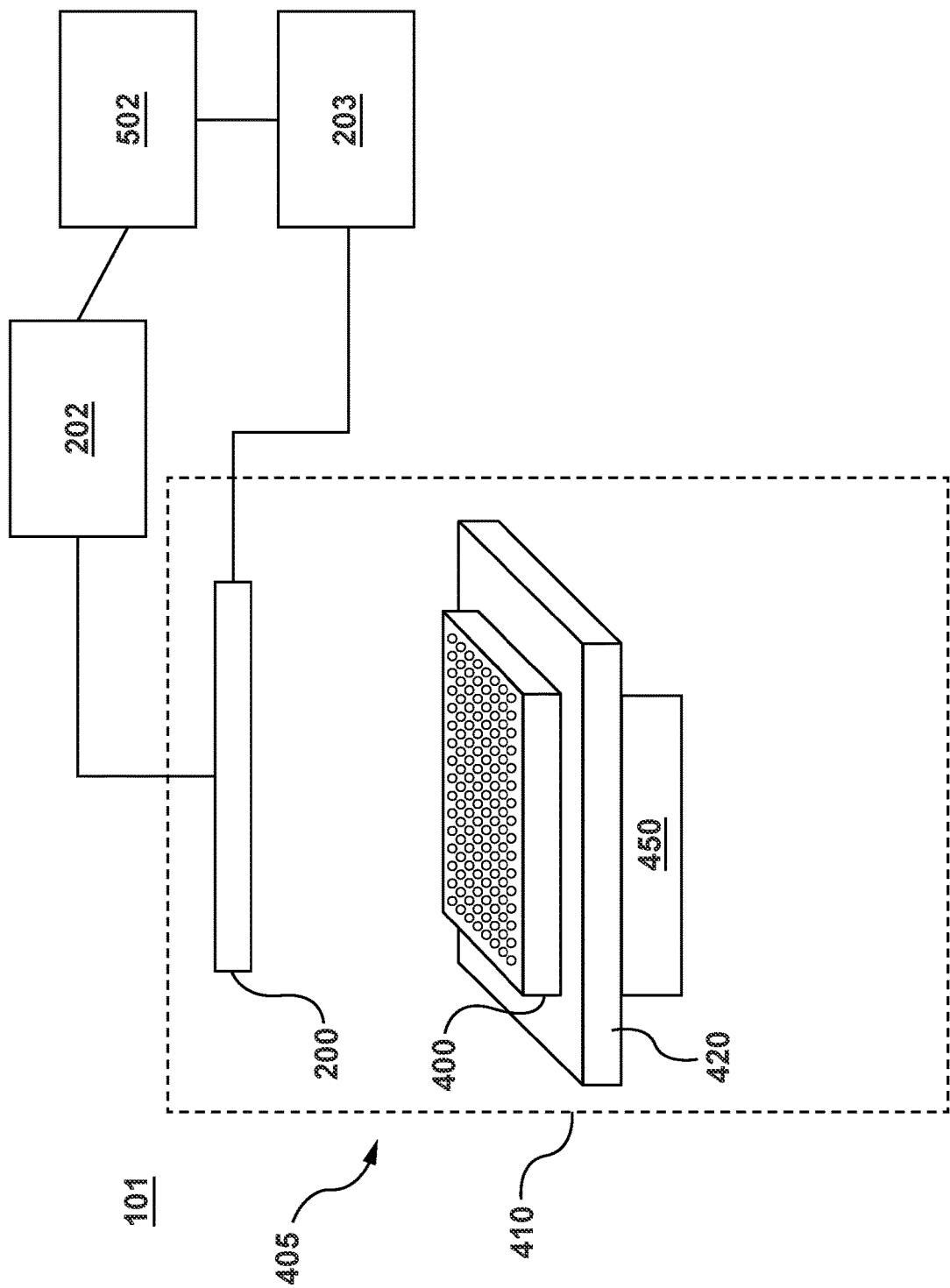
FIG. 12 illustrates an example SiPM based assay device consistent with embodiments hereof.

In some embodiments, the protocol manager 518 may be configured to control one or more assay devices, such as assay device 101, as illustrated, e.g., at FIG. 12. The protocol manager 518 may be configured to operate to control one or more assay devices 101 to perform sample assays. In such embodiments, the target object 350 may include, for example, samples contained in multi-well sample plates of the assay device 101, as discussed further below with respect to FIG. 12. Assay devices 101 may be controlled by the protocol manager 518 to obtain sample assay measurements on a plurality of test samples (e.g., test samples disposed in a multi-well plate) having unknown quantities of an analyte. The protocol manager 518 may operate to determine sample assay signal values corresponding to the plurality of test samples. The protocol manager 518 is configured to perform the sample assays to determine one or more sample assay data sets. The sample assay data sets may include information relating the sample assay signal values to sample identification data. Sample identification data may include any suitable data for identifying a test sample, such as plate location.

In embodiments, the protocol manager 518 is configured to, e.g., interact with the SiPM input manager 512, the SiPM output manager 514, and the temperature determination manager 516 to determine SiPM temperature before, during, and/or after target object measurements to account for SiPM gain variations caused by temperature variations. The protocol manager 518 is further configured to communicate with the various other managers and software protocols in operation on the computing system 502 to carry out its required functions.

Figure 6:
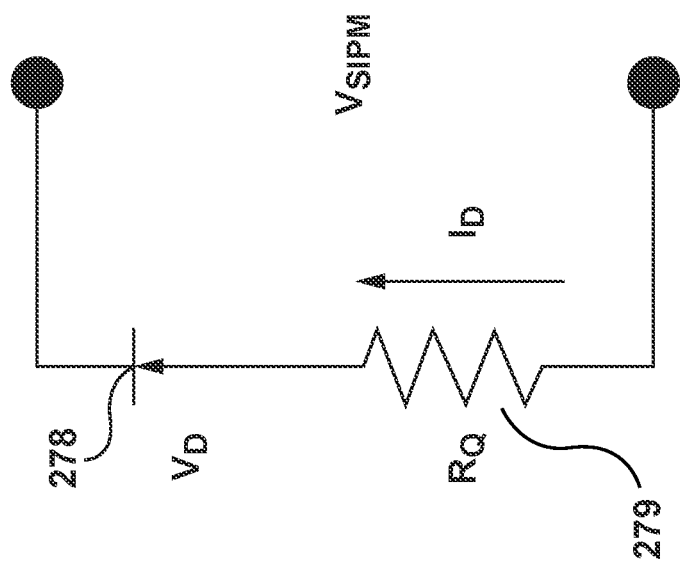
FIG. 6 illustrates a quench resistor of a silicon photomultiplier device consistent with embodiments hereof.
Figure 9:
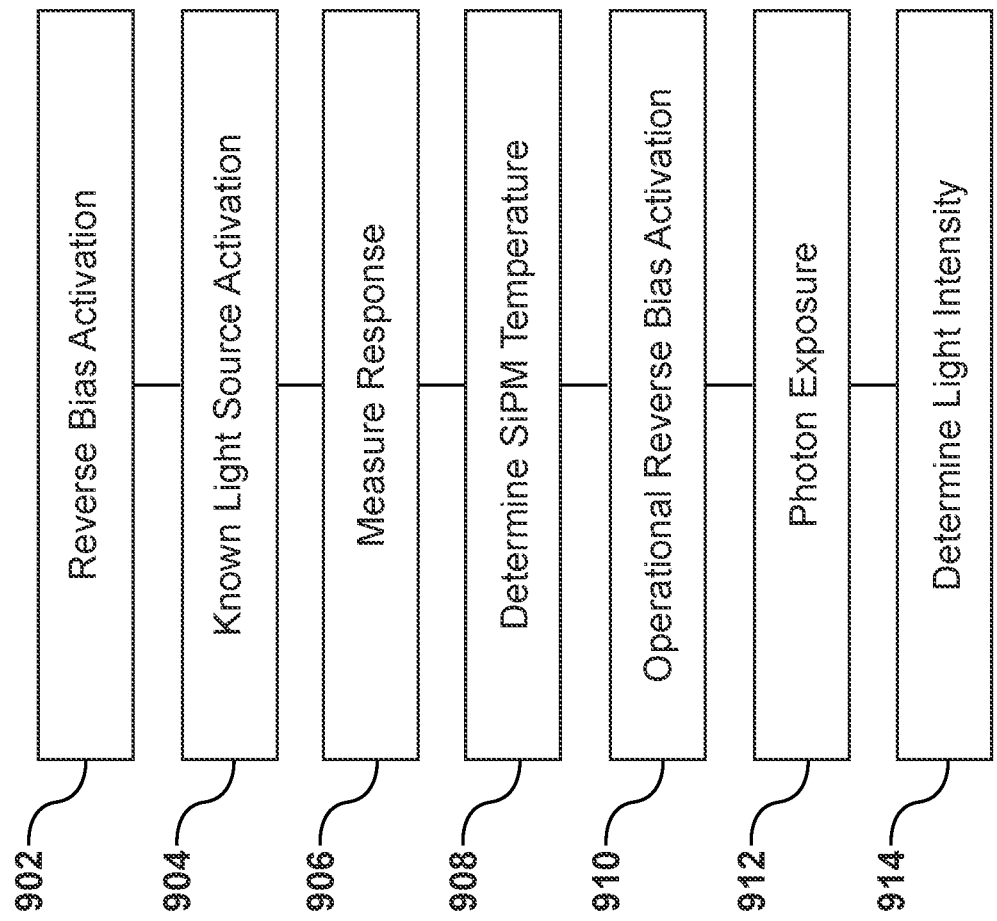
FIG. 9 shows a flow chart illustrating an exemplary method of obtaining temperature corrected assay data consistent with embodiments hereof.
Figure 10:
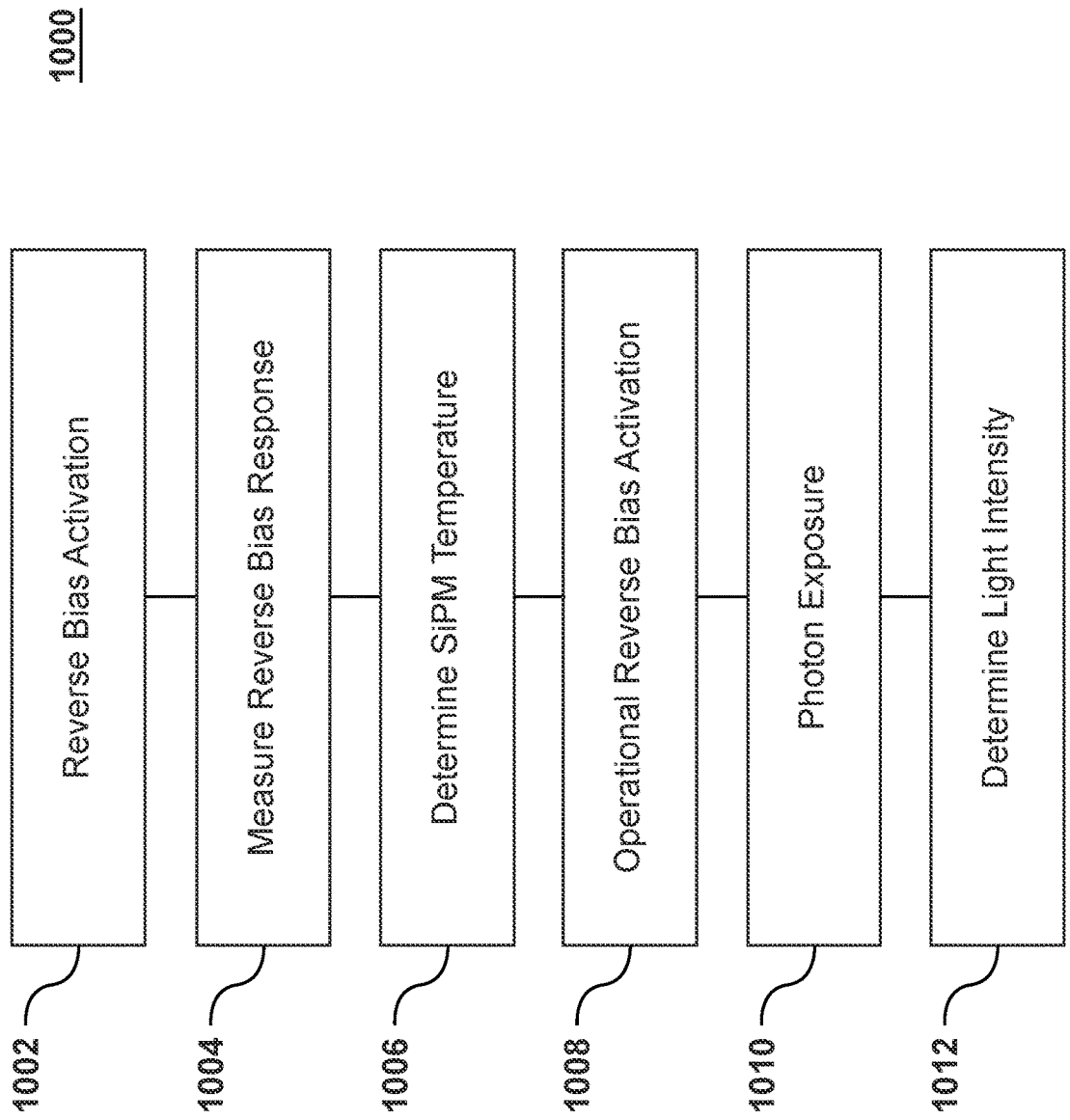
FIG. 10 shows a flow chart illustrating an exemplary method of obtaining temperature corrected assay data consistent with embodiments hereof.

The protocol manager 518 is further configured to manage, control, and/or otherwise facilitate the performance of the functionality and operation of the light detection device 301 according to the steps, procedures, algorithms, and methods outline with respect to FIGS. 6, 9, and 10.

The data manager 520 is a software protocol or software module that may operate on the computing system 502. The data manager 520 is configured to access temperature determination data. Temperature determination data may include any and all data, models, correlations, etc., produced by or required by the computing system 502 to determine SiPM temperature and account for assay results based on SiPM temperature. In further embodiments, the data manager 520 is configured to access various removable physical storage media that may store assay data.

In further embodiments related to control of the assay device 101, the data manager 520 is configured to, e.g., access assay data, such as sample assay data and calibration assay data of one or more assay devices 101. Assay data may include, for example, sample assay data sets and calibration data sets, which may be obtained in near real time, may be archived data, and/or may be data extracts, as well as process information and process parameter information and any other information or data generated by or stored on an assay device 101.

The data manager 520 may provide data to a user via the user interface manager 522. In embodiments, the data manager 520 is further configured to, e.g., provide access tools to the user to manage and manipulate any and all data associated with the light detection device 301 (also referred to as assay system data). For example, the data manager 520 may be configured to generate reports, collate system data, cross-reference system data, populate databases with system data, etc. In embodiments, the data manager 520 may provide data retention capabilities. The data manager 520 is further configured to receive and store any and all data collected and/or used by the light detection device 301. The data manager 520 is further configured to communicate with the various other managers and software protocols in operation on the computing system 502 to carry out its required functions.

The user interface manager 522 is a software protocol (e.g., software module or library) operating on the computing system 502. The user interface manager 522 is configured to provide, e.g., a user interface to allow user interaction with the computing system 502. The user interface manager 522 is configured to receive input from any user input source, including but not limited to touchscreens, keyboards, mice, controllers, joysticks, voice control. The user interface manager 522 is configured to provide a user interface, such as a text based user interface, a graphical user interface, or any other suitable user interface.

The user interface manager 522 is configured to provide, e.g., user authentication services. Users may be authenticated via, for example, passwords, biometric scanning (retina scans, fingerprints, voice prints, facial recognition, etc.), key cards, token access, and any other suitable means of user authentication. User authentication services may be provided to control access to one or more assay devices 101. The user interface manager 522 is further configured to communicate with the various other managers and software protocols in operation on the computing system 502 to carry out its required functions.

The various managers, as discussed herein, may be implemented by any combination of computing devices. Although described herein as operational on a single computing system 502, the various managers and protocols described herein may operate in a distributed fashion of multiple computing devices and/or in conjunction with cloud processing. Accordingly, the functionality of the various managers and software protocols described herein may occur in different physical locations without departing from the scope of this disclosure. For example, aspects of a temperature determination manager may be implemented by a user on a different computing system after all data has been collected by a computing system associated with an assay device.

Figure 5:
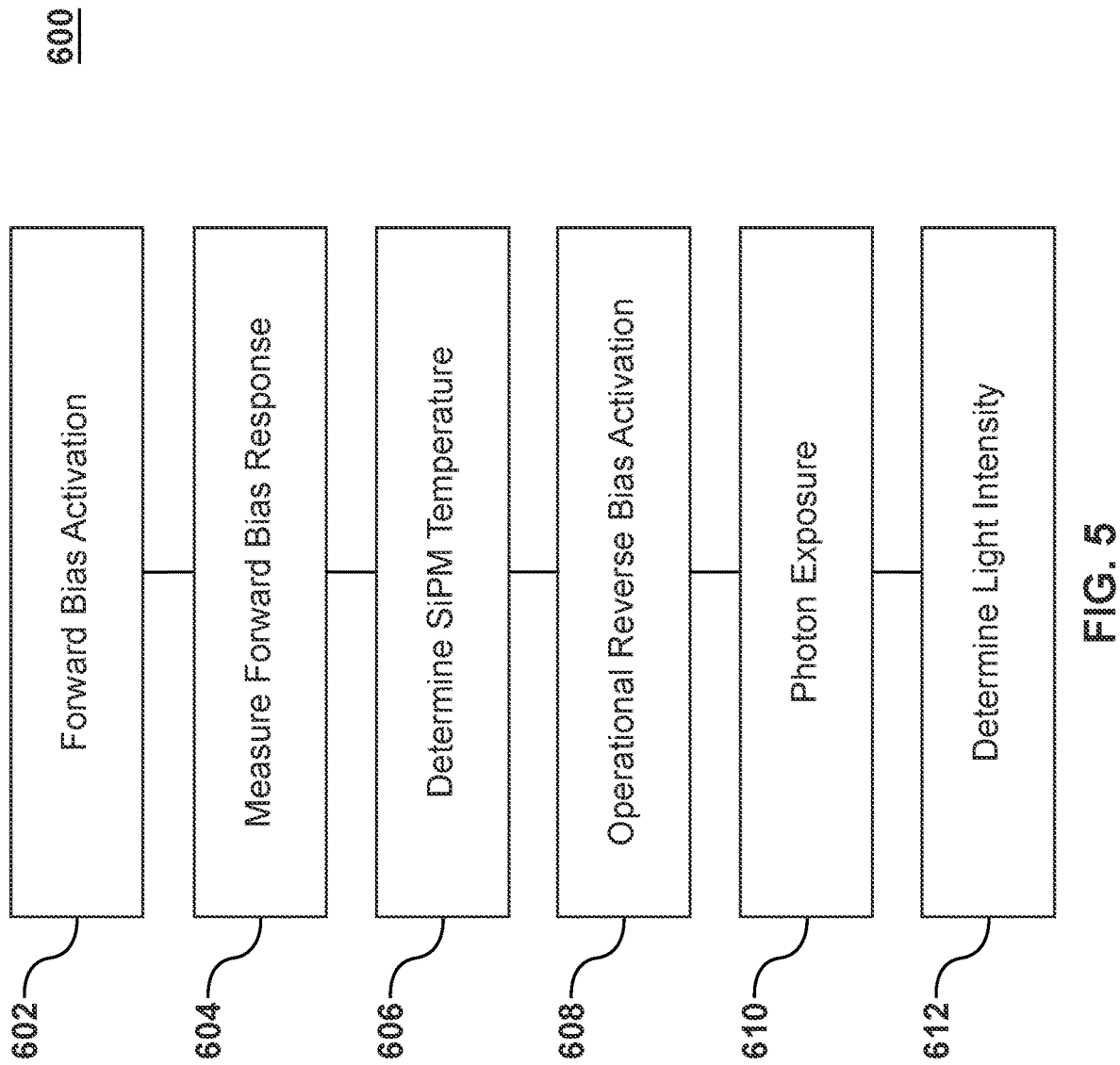
FIG. 5 shows a flow chart illustrating an exemplary method of obtaining temperature corrected assay data consistent with embodiments hereof.

FIG. 5 is a flow chart illustrating an exemplary method of acquiring temperature corrected assay data. More specifically, FIG. 5 illustrates a process 600 of acquiring temperature corrected data employing a temperature determination made by the computer system while operating a SiPM in a forward bias mode. The process 600 is performed by one or more computer systems, such as computer system 502, having one or more physical processors (e.g., 510) programmed with computer program instructions that, when executed by the one or more physical processors, cause the computer system to perform the method. The process 600 is further performed with the use of one or more light detection devices 301, including, for example, assay device 101, having one or more SiPM devices, such as SiPM 200. In embodiments, the process 600 is carried out via one or more computing systems 502 and the light detection device 301 having the SiPM 200. The one or more computing systems 502 may be associated with a light detection device 301 and/or may communicate with a light detection device 301. Although described with respect to the particular light detection devices, assay devices, and SiPM described herein, the process 600 is not limited to such and may be employed with any suitable assay device and/or SiPM.

The computing system 502 represents an example of a hardware and software combination configured to carry out process 600, but implementations of the process 600 are not limited to the hardware and software combination of the computing system 502. In further embodiments, the process 600 may be implemented exclusively in hardware and/or firmware. Additional details regarding each of the operations of the method may be understood according to the description the computing system 502, as described above. The process 600 is described with respect to specific hardware and software for example purposes but may be carried out via any suitable hardware and/or software capable of performing the described actions or steps. The following aspects of the process 600 may be carried out by various managers and software protocols of the computing system. In particular, the following aspects may be organized and run according to an overall assay process operated and managed by the protocol manager 518.

In an operation 602 of the process 600, a SiPM (e.g., SiPM 200) is activated in a forward biased voltage mode. For instance, the SiPM input manager 512 is configured to control the power source (e.g., 202) to activate the SiPM. The power source is controlled to activate the SiPM in a forward biased voltage mode by applying, e.g., either a positive fixed current or positive fixed voltage as a forward bias mode input signal to the one or more PADs (e.g., 201) of the SiPM. When operated in a forward biased mode, photons incident on the SiPM (e.g., from ambient light) do not cause a change in the output current from the SiPM.

In an operation 604, an output monitor (e.g., 203) and/or SiPM output manager (e.g., 514) measures or detects a response to the activation in the forward biased voltage mode. The output monitor may be configured to measure or determine an output current and/or an output voltage induced in response to the forward biased activation of the SiPM. The SiPM output manager is configured to control the output monitor to determine the output current or the output voltage to receive a measurement of the output current or the output voltage as a forward bias mode response signal.

In an operation 606, the computer system determines a temperature of the SiPM based on the forward bias activation and the response to the activation. In the forward bias mode, the PADs (e.g., 201) of the SiPM may operate according to the Shockley ideal diode equation, which includes a temperature dependency. The temperature determination manager 516 operates to determine the temperature of the SiPM according to the forward bias mode input signal and the forward bias mode response signal, as explained in detail below.

In an example, the current conducted through an ideal diode may be described by the Shockley \ diode equation, Equation 1.

$$I_D = I_S \left[ \exp\left(\frac{qV_D}{nk_BT}\right) - 1 \right] \quad \text{Equation 1}$$

The Shockley diode equation provides a relationship between the current $I_D$ and the voltage $V_D$ of a diode in both forward and reverse bias configurations. In Equation 1, q is the electron charge, $k_B$ is Boltzmann's constant, T is the absolute temperature of the diode junction (in Kelvin), and $V_D$ is the voltage across the diode. The ideality factor n, which typically varies between 1 and 2, represents a quality factor or emission coefficient of the diode in use. The ideality factor n accounts for the recombination of holes with free electrons in the depletion region and is a function of semiconductor materials and doping levels. n is fixed for a given diode and may vary widely between respective diodes. The ideality factor n may be set to 1 in an "ideal" diode. $I_S$ is the reverse bias saturation current given approximately by equation 2.

$$I_s = AT^{\frac{3}{n}} * \exp\left(-\frac{E_g}{nk_BT}\right) \quad \text{Equation 2}$$

Equation 2 provides the temperature dependency of the reverse bias saturation current ($I_S$) and thus at least partially drives the temperature dependency of the diode current $I_D$. In equation 2, A is a constant factor that depends primarily on manufacturing factors such as geometry and doping of the semiconductor junction region, and Eg is the semiconductor band gap. Semiconductor doping refers to the process of introducing impurities to the diode semiconductor to manipulate and/or modulate the electrical properties of the semiconductor (and thus, the diode). The band gap for silicon is approximately 1.17 eV at OK and 1.11 eV at 300K. For diodes consistent with embodiments herein, band gaps may be measured as approximately 0.67 eV to 1.30 eV or between 1.10 eV to 1.30 eV. Equation 1 for $I_D$, the diode current, is nonlinear. It is possible, however, to identify operational parameters that produce approximately linear behavior over a useful range of temperatures.

$$V_D = \frac{nk_BT}{q} \ln\left[\frac{I_D}{AT^{\frac{3}{n}}} + \exp\left(-\frac{E_g}{nk_BT}\right)\right] + \frac{E_g}{q} \quad \text{Equation 1}$$

may be solved for the voltage $V_D$ as shown in equation 3.

$$V_D = \frac{nk_BT}{q} \ln\left[\frac{I_D}{AT^{\frac{3}{n}}} + \exp\left(-\frac{E_g}{nk_BT}\right)\right] + \frac{E_g}{q}. \quad \text{Equation 3}$$

$$V_D = \frac{nk_BT}{q} \ln\left[\frac{I_D}{AT^{\frac{3}{n}}} + \exp\left(-\frac{E_g}{nk_BT}\right)\right] + \frac{E_g}{q}$$

Although this equation may not be solved directly to provide a calculation of T from $V_D$ and $I_D$, prior knowledge of the constants A, n, Eg, q, and $k_B$ permit the use of numerical methods to determine T from a single measurement of $V_D$ and $I_D$. Accordingly, Equation 3 may be used to determine the temperature of a diode based on the voltage and current across the diode.

When applied to a SiPM device, such as SiPM 200, Equation 3 may be modified to account for additional circuitry within the SiPM 200. For example, in an embodiment, SiPM 200 may include a plurality of quenching resistors incorporated with the PADS 201, as discussed above. For the purpose of the temperature analysis discussed herein, the SiPM 200 and plurality of quenching resistors may be modeled as a single diode 278 with a quench resistor 279 ($R_Q$) in series, as shown in FIG. 5. The voltage across the diode, $V_D$ cannot be directly measured and must be determined according to the voltage $V_{SIPM}$ measured across the entire SiPM 200 with the voltage ($V_{RQ}$) across the quenching resistor 279 subtracted out. $V_{RQ}$ is the current $I_D$ across the quenching resistor 279 times the resistance $R_Q$ of the quenching resistor. Revising Equation 3 accordingly leads to Equation 4.

$$V_{SIPM} = \frac{nk_BT}{q} \ln\left(\frac{I_D}{AT^{\frac{3}{n}}} + e^{-\frac{E_g}{nk_BT}}\right) + \frac{E_g}{q} + I_D R_Q \quad \text{Equation 4}$$

Equation 4 was tested against data experimentally obtained from a SiPM device, the Hamamatsu S13360-6075CS. Using n=1.0 (experimentally obtained), and $R_Q$=43.8 Ohms, along with the measured values of T, $V_D$, and $I_D$, numerical methods were employed to determine A. A was determined to be approximately 622 amps for this device. These values are by way of example only for the specifically cited SiPM device. Different SiPM devices may have different values for these terms. Individual ones of same-type SiPM devices may also have different values for these terms, according to manufacturing variation.

Figure 13:
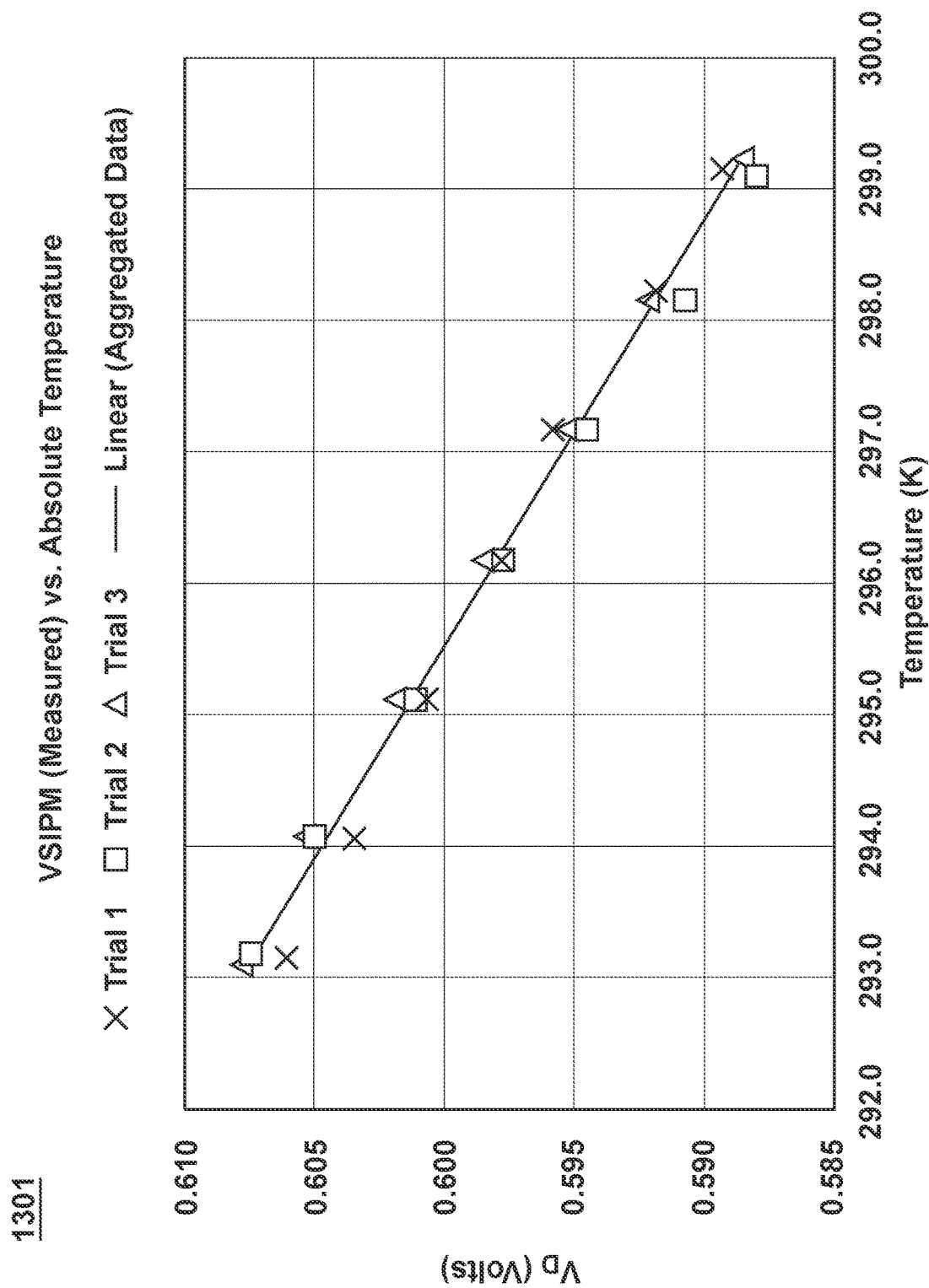
FIG. 13 is a chart showing a correlation between measured temperature and measured voltage in an example SiPM device.

FIG. 13 provides the results of several trial runs using the Hamamatsu S13360-6025CS SiPM device wherein the temperature and voltage were measured at a constant current as the temperature was varied in a temperature control chamber. The chart 1301 illustrated by FIG. 13 demonstrates a correlation between the voltage and temperature that is consistent across multiple runs, indicating the experimental validity of using the measured voltage to determine SiPM temperature.

As discussed above, for a constant current, the voltage across the diode varies according to the temperature. Accordingly, once the material and calibration constants for the Equation 4 are selected, the temperature of the diode may be measured by maintaining a constant current across the diode by the power source (e.g., 202) and measuring the voltage $V_{SIPM}$ produced by the constant current that is supplied.

Returning now to FIG. 5, at operation 606, the computer system, e.g., the temperature determination manager 516, may compare the current provided by the power source (e.g., 202) to the voltage measured by the output monitor (e.g., 203) to determine a temperature of the SiPM. The SiPM temperature may be determined according to a correlation between the voltage across the SiPM 200 (i.e., across the plurality of PADs (e.g., 201)) and current through the SiPM 200 (i.e., through the plurality of PADs) in a forward biased mode.

Figure 16:
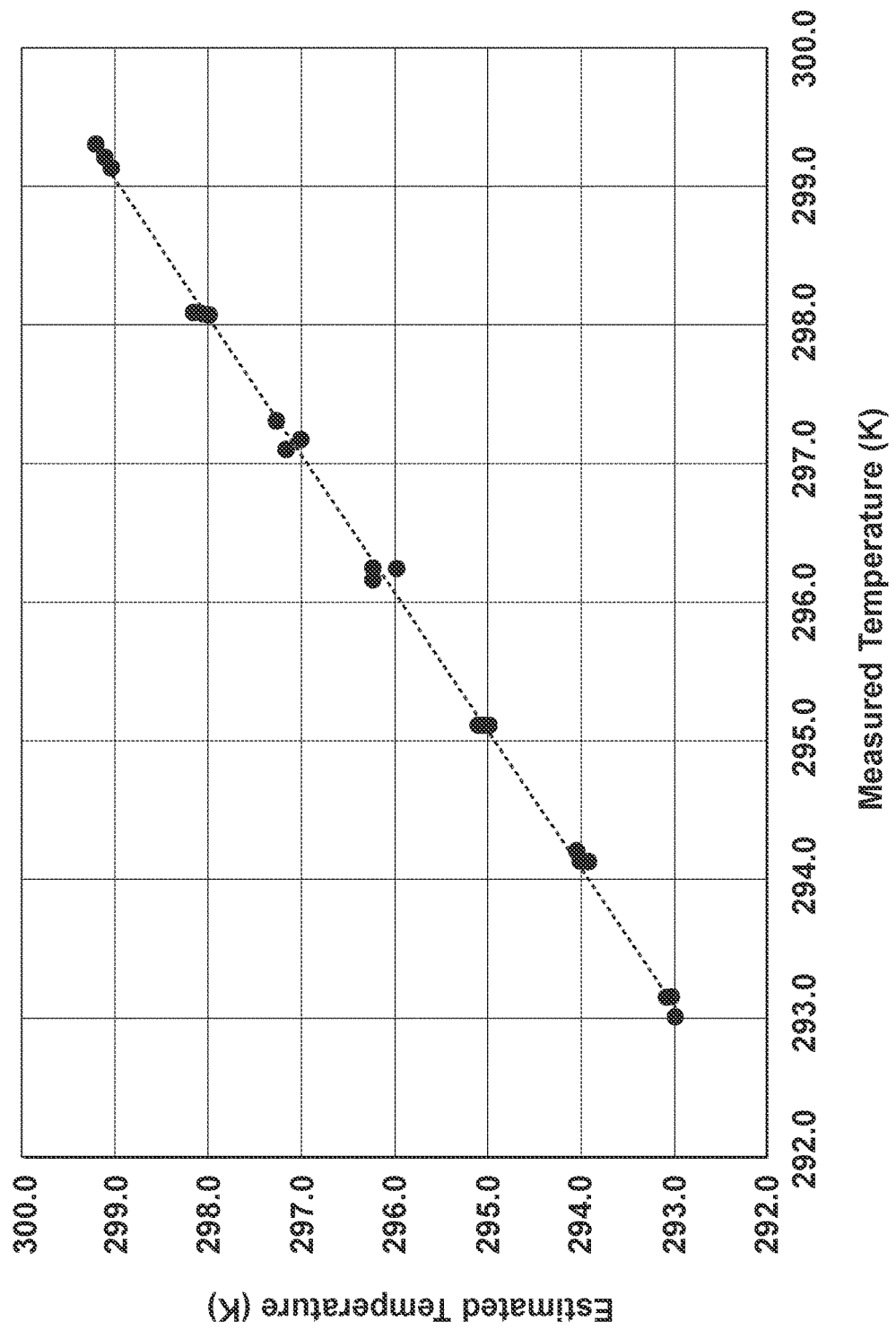
FIG. 16 is a chart comparing estimated temperatures to measured temperatures according to embodiments hereof.

In further embodiments, when the forward bias voltage is provided by a constant voltage source, the computer system may be configured to determine the resultant current based on measurements received from the output monitor. The provided voltage and measured current may then be used with Equation 4, as discussed above, to determine diode temperature. Although Equation 4 may not be solvable for the temperature T, direct numerical solutions may be employed to determine T according to appropriate values for the constants and measured values for the voltage and current. The values for the constants discussed herein may vary according to the type and arrangement of the equipment used and may be appropriately determined through experimentation to be employed in a practical arrangement of a silicon photomultiplier device. FIG. 16 provides an illustration of the results of the operation 606. The chart 1601 of FIG. 16 shows a comparison of temperatures during SiPM operation via conventional means (e.g., temperature sensors) as compared to temperatures estimated by the methods and techniques discussed herein. Specifically, FIG. 16 shows SiPM temperatures estimated via the voltage and current measurements associated with Equation 4 and operation 606. As shown in FIG. 16, the estimated and measured temperatures show a high degree of correspondence, indicating that the methods of operation 606 is able to accurately measure SiPM temperature.

In further embodiments, SiPM temperature may be determined according to a two point method. Operations 602 and 604 may each be performed twice, activating the SiPM in a forward bias mode at two different currents ($I_{D1}$ and $I_{D2}$) and measuring two different voltages ($V_{D1}$ and $V_{D2}$). The two activations may be performed for a short time each and with a small time delay to prevent any significant or substantial change in diode temperature due to the repeated activations.

After activation and measurement at operations 602 and 604, operation 606 may be performed to measure the temperature as follows.

Equation 5 defines the ratio of the two current and voltage measurements, based on Equation 1, above.

$$\frac{I_{D1}}{I_{D2}} = \frac{I_S\left[\exp\left(\frac{qV_{D1}}{nk_BT}\right) - 1\right]}{I_S\left[\exp\left(\frac{qV_{D2}}{nk_BT}\right) - 1\right]} \qquad \text{Equation 5}$$

The term $$\exp\left(\frac{qV_{D1}}{nk_BT}\right)$$

is much larger than 1 for temperatures in the expected range of the SiPM, e.g., below 40 C. For example, using the Hamamatsu S13360-6075CS SiPM device as an example, at a temperature of 29 C, this term yields a result of approximately 1.3*109. Accordingly, Equation 5 may be approximated according to Equation 6.

$$\frac{I_{D1}}{I_{D2}} = \frac{\exp\left(\frac{qV_{D1}}{nk_BT}\right)}{\exp\left(\frac{qV_{D2}}{nk_BT}\right)} \qquad \text{Equation 6}$$

Equation 6 may be simplified and rearranged to solve for T and yield Equation 7.

$$T = \frac{q}{nk_B} \cdot \frac{(V_{D1} - V_{D2})}{\ln(I_{D1}) - \ln(I_{D2})} \qquad \text{Equation 7}$$

As discussed above, $V_D$ may not be directly measurable in some embodiments, due to the diode structure including a quenching resistor. In such cases, the resistance $R_Q$ of the quenching resistor must be accounted for. Accounting for this term in Equation 7 leads to Equation 8.

$$T = \frac{q}{nk_B} \cdot \frac{(V_{SIPM1} - I_{D1} \cdot R_Q) - (V_{SIPM2} - I_{D2} \cdot R_Q)}{\ln(I_{D1}) - \ln(I_{D2})} \qquad \text{Equation 8}$$

Equation 8 provides a direct estimation of the SiPM temperature T based on measurements of two different currents and two different voltages, without requiring numerical solving methods.

Figure 14:
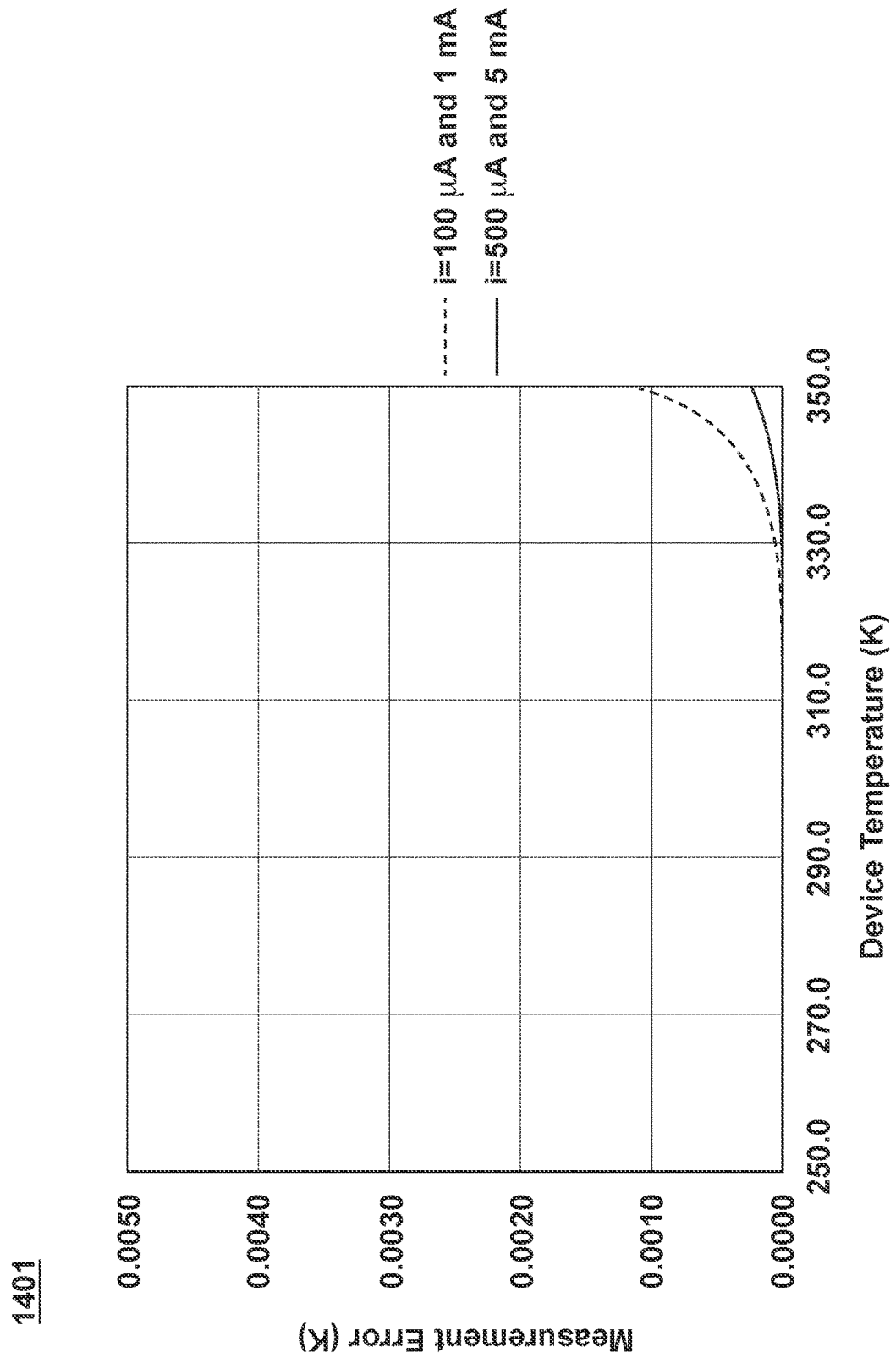
FIG. 14 is a chart showing a theoretical error in a two point method of determining SiPM temperature according to embodiments hereof.
Figure 15:
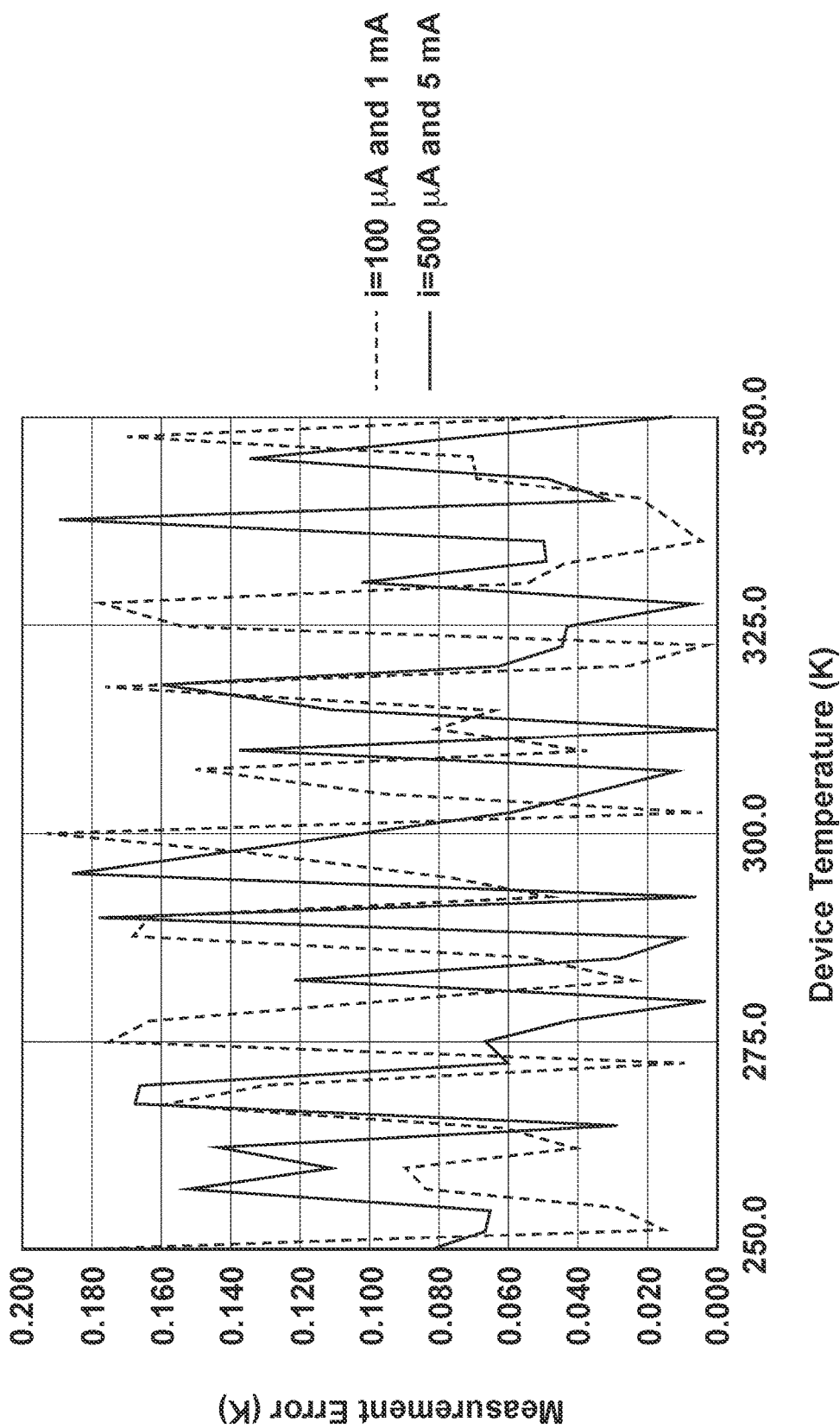
FIG. 15 is a chart representing an amount of measurement error in K resulting from noise in measured voltages.

The simplifying assumption made to produce Equation 7 may result in a potential error between a calculated temperature and a measured temperature. The theoretical error for the temperature range between 250 K and 350 K was computed by using Equation 4 to determine expected values for $V_{SIPM}$ at selected temperatures in the 250-350 K temperature range and four different currents $I_D$ (10 μA, 100 μA, 1 mA and 5 mA). The computed $V_{SIPM}$ values and $I_D$ values were then used in Equation 8 to determine a two-point method calculated temperature. The two-point method calculated temperatures and the selected temperatures were then compared to absolute temperature error. FIG. 14 shows the absolute error between the two-point method calculated temperatures and the selected temperatures plotted against the selected temperature. As illustrated in the chart 1401 of FIG. 14, for operating temperatures below 350K, the calculated error due to the simplifying assumptions in the two-point method is less than 0.1 C. If the values for the two currents are selected as 500 µA, and 5 mA, the absolute error reduces to less than 0.02 C for temperatures below 350K. At common operating temperatures, e.g. below 313K (40 C), the absolute error is negligible. FIG. 15 shows a graph representing an amount of measurement error in K resulting from noise in measured voltages. In FIG. 15, the voltage measurements are subject to noise up to 20 µV (peak to peak). As shown in the chart 1501 of FIG. 15, the error remains under 0.2 C in the presence of up to 20 µV (peak to peak) of noise in the two measured voltages. Accordingly, the two point method represents an accurate method of determining SiPM temperatures in expected operating temperature ranges below 350K.

In an operation 608, after the temperature is measured, the power source (e.g., 202) is controlled by the SiPM input manager (e.g., 512) to apply an operational reverse bias voltage to the one or more PADs 201 of the SiPM 200 by applying an operational input signal. The SiPM thus enters an operational reverse bias mode. Applying the operational reverse bias voltage prepares the SiPM 200 to measure output photons from the target object 350. The operational reverse bias voltage to be applied is determined, e.g., by the computer system, according to the temperature dependence of the breakdown voltage so as to maintain a constant overvoltage between measurements. The gain G of a SiPM is given by Equation 8.

$$G = \frac{(V_{Bias} - V_{Br})C_j}{q}. \quad \text{Equation 9}$$

Figure 7:
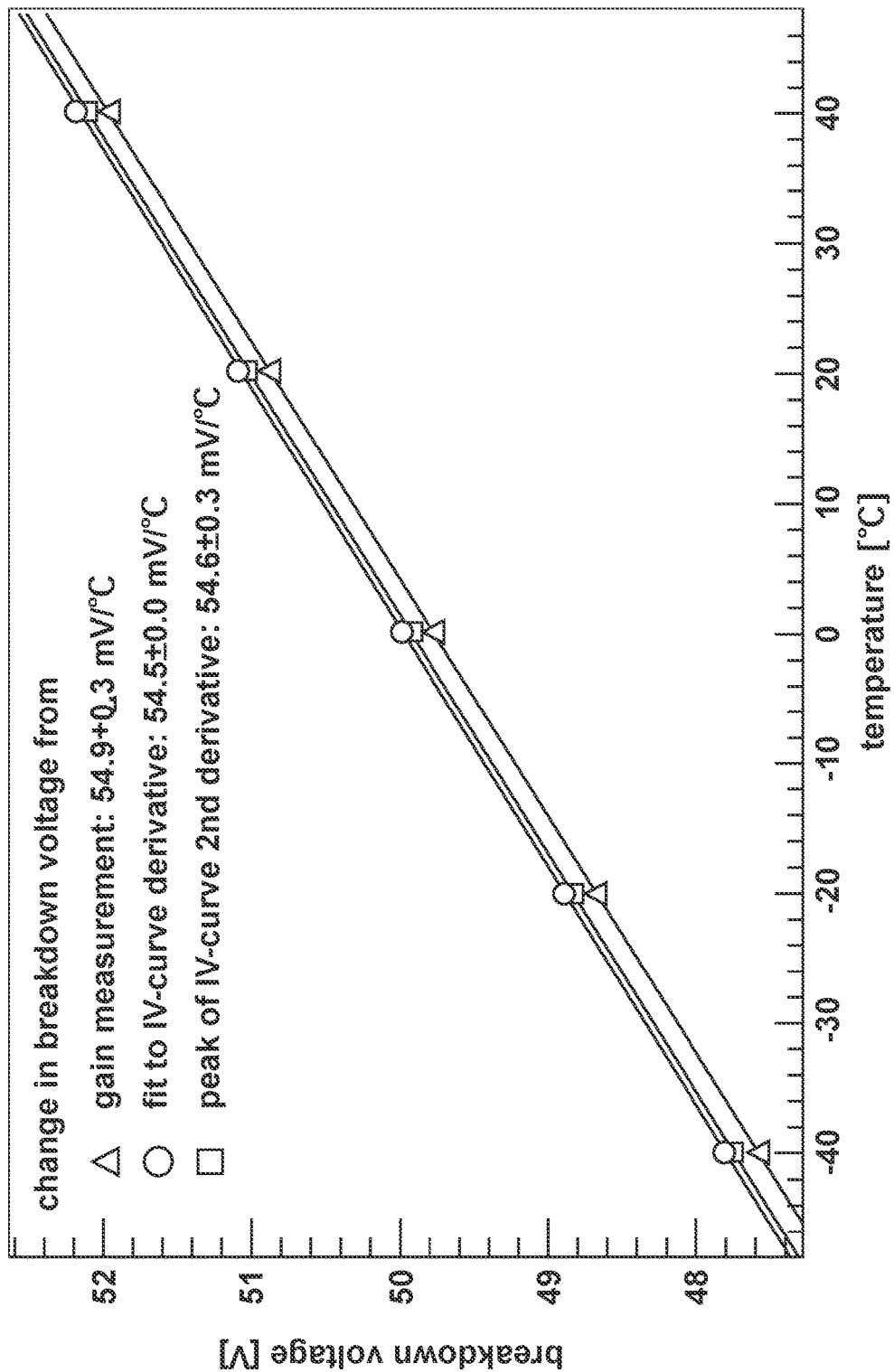
FIG. 7 shows a chart illustrating a temperature dependence of breakdown voltage in an example SiPM device.

In Equation 9, Cj is the total capacitance of the SiPM and q is the elementary charge and, as discussed, $V_{Br}$ (breakdown voltage) is temperature dependent. By selecting the operational reverse bias voltage $V_{Bias}$ according to the temperature associated with each specific measurement, the computer system protocol manager is able to ensure that the gain G remains constant. FIG. 7 illustrates a graph 701 showing the temperature dependence of breakdown voltage in an example SiPM device (Hamamatsu S13360-3050CS). Thus, for example, the measured temperature from operation 606 and equation 8 may be employed to estimate or determine a current value of $V_{Br}$ and the computer system protocol manager may therefore select an appropriate reverse bias voltage $V_{Bias}$ to maintain a constant gain G.

In further embodiments, the operational reverse bias voltage may be selected to maintain a constant reverse bias voltage (and therefore a variable overvoltage) between photodetection measurements. Accordingly, the protocol manager may select a predetermined operational reverse bias voltage and apply it to the SiPM.

In an operation 610, the SiPM is exposed to photons, or more generally light (e.g., visible light, infrared light, ultraviolet light, etc.), reflected from, emitted by, or otherwise originating from the target object. Any process or operation that generates photons may be measured during the operation 610. Exposing the SiPM to the photons results in one or more photons striking the PADs of the SiPM. As discussed above with respect to FIGS. 2 and 3, exposing the SiPM to one or more photons induces an analog output current response.

In an embodiment involving assay measurements, photons may be produced during an assay process, such as electrochemiluminescence. Any test process that generates photons may be employed. For example, an assay device may be configured to expose one or more samples within sample wells of a multi-well sample plate to an electric field that causes solvent agents to produce photons, for example, by electrochemiluminescence.

In an operation 612, the computer system (e.g., 502) measures, receives, or otherwise determines an output current response from the SiPM in response to the incident photons. The measured output current is integrated over time to determine the total amount of charge measured by the output monitor in response to the photon exposure. The relationship between the total amount of charge measured by the output monitor and the number of photons striking the SiPM is the gain G of the SiPM. The total charge measured by the output monitor may be divided by the gain to determine the number or amount of photons to which the SiPM was exposed during the exposure.

In embodiments wherein the overvoltage is maintained at a constant level, the gain is similarly maintained at a constant level. Accordingly, determining the light intensity (i.e. incident photon number) may be achieved by dividing the measured total charge output by the predetermined constant gain G.

In further embodiments, wherein the operational reverse bias voltage is maintained at a predetermined constant level, the measured temperature may be used to determine the gain, G according to a look-up table or equation specific to either the SiPM device or photodiodes used. The determined gain G may then be used to determine the light intensity (i.e. incident photon number) by dividing the measured total charge output by the predetermined constant gain G.

The process 600 of acquiring temperature corrected assay data may be performed, in some embodiments, according to the operations 602-612 in the order that they are described above. In further embodiments, the process 600 may include more or fewer operations than the above described operations 602-612, may include the operations in a different order, and/or may include some operations multiple times.

For example, in some embodiments, the temperature of the SiPM may be measured after photodetection data is captured. In further embodiments, the temperature of the SiPM may be measured both before and after the photodetection data is captured. In such embodiments, the operational reverse bias voltage (and not the overvoltage) may be maintained as a constant. The before and after measurements may be combined to estimate the temperature during the data capture operation. Based on the temperature at the time of measurement, the gain may be computed. The gain may then be used to determine the incident light intensity.

The computer system then uses the recorded temperature of the SiPM to determine the intensity of the light (or photons) striking the SiPM according to the temperature and the response signal. Knowledge of the recorded temperature immediately prior (or subsequent to) current detection permits an accurate determination of the output light intensity according to the equations discussed above with respect to operation 606.

As described above, Equations 1-9 are used in an example method of determining SiPM temperature based on measurements made in a forward bias voltage mode and adjusting or accounting for the determined temperature. In the forward bias voltage mode, as described above, the SiPM may function as a thermometer. The method discussed above and with respect to Equations 1-9 is provided by way of example only. In further embodiments, Equations 1-9 may be modified as necessary according to the specific components of a SiPM device being used. For example, use of different diodes and/or different circuitry within a SiPM may necessitate the modification of the selected equations. In further embodiments, correlations and/or look-up tables that provide correlations between the operative circuit parameters and temperature, as described above, may be employed in place of specific equations. In embodiments, such correlations and/or look up table may be employed in either or both of determining temperature based on a forward bias voltage input and accounting for temperature when making a SiPM measurement under reverse bias conditions. Such correlations and/or look-up tables may be established, for example, based on the equations described above and/or based on modified versions of these equations. In further embodiments, such correlations and/or look-up tables may be established at least partially experimentally.

Figure 8:
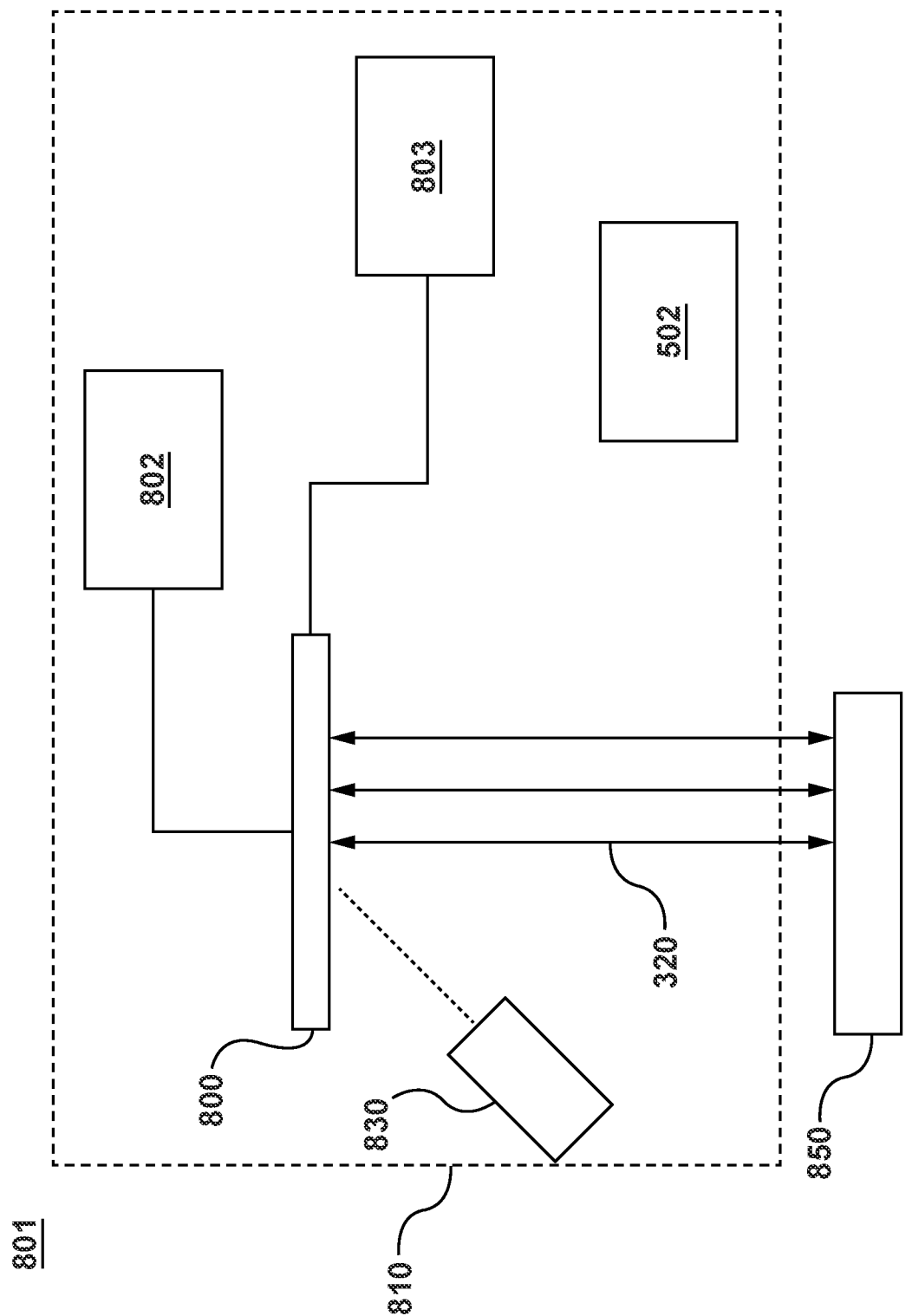
FIG. 8 is a schematic illustration of an example SiPM device configured for light sensing consistent with embodiments hereof.

FIG. 8 illustrates a light detection device 801 configured with a reference light source 830. The light detection device 801 includes a housing 810 and a silicon photomultiplier device (SiPM) 800 having a plurality of photo-avalanche diodes (PADs) (not shown), a power source 802, and an output monitor 803. The SiPM 800 is arranged to oppose one or more target objects 850 within the housing 810. The SiPM 800 is configured and arranged so as to receive light emitted from the target object 850 during a photo-detection measurement. The SiPM is arranged to receive input power (e.g., voltage or current input) via power source 802 and to generate an output signal (e.g., voltage or current output) that may be detected or monitored by the output monitor 803. In the example of FIG. 8, the assay device 101 further includes a light source 830. The light source 830 is a device configured to selectively output light and may include, e.g., one or more of an LED, diode laser, halogen, incandescent, fluorescent bulb. The light source 830 may be a stable light source configured to selectively provide a precise and accurate light intensity. The light source 830 is arranged within the housing 810 such that a pre-defined light intensity produced by the light source 830 falls on or strikes the SiPM 800. The light source 830 is configured and positioned within the housing 810 such that it does not interfere with the optical path required for light to reach the SiPM from the target object 850. In some embodiments, the light source 830 may be configured and arranged so as to be movable, e.g., to move out of the optical path after being used to illuminate the SiPM 800.

In the example of FIG. 8, the light source 830 is configured to selectively illuminate the SiPM 800 at a pre-determined level (e.g., predetermined intensity, predetermined number of photons, predetermined luminance, etc.). Because the amount and intensity of light striking the SiPM 800 is pre-defined and known, the temperature of the SiPM 800 may be determined from the voltage (e.g., input voltage), current (e.g., output current), and known light intensity. As discussed above, the gain of the SiPM 800 when operated at a fixed operational bias voltage is dependent upon the temperature of the SiPM 800. The gain of the SiPM 800 may be determined, as discussed above, according to the relationship between the known input light intensity and the output current. Because the gain at a specific bias voltage depends on temperature, the temperature of the SiPM may be determined according to the gain and the input voltage. The correlation between temperature and gain for the specific SiPM hardware in use may be determined based on, for example, an appropriate look-up table, data table entry, and/or equation according to the specifications of the SiPM hardware in use. Thus, the temperature of the SiPM 800 may be determined by measuring the gain of the SiPM 800.

FIG. 9 is a flow chart illustrating a method of acquiring temperature corrected photodetector measurement data. More specifically, FIG. 9 illustrates a process 900 of acquiring temperature corrected data employing a temperature determination made by the computing system (e.g. 502) when subjecting the SiPM to a known light intensity. The process 900 is performed by one or more computer systems, such as computer system 502, having one or more physical processors programmed with computer program instructions that, when executed by the one or more physical processors, cause the computer system to perform the method/process. In embodiments, the process 900 is further performed with the use of one or more light detection devices, such as light detection device 801. In embodiments, the process 900 is carried out via one or more computing systems 502 and light detection device 801. Although described with respect to the particular light detection devices and SiPM described herein, the process 900 is not limited to such and may be employed with any suitable light detection device and/or SiPM (including assay devices and systems).

The computing system 502 represents an example of a hardware and software combination configured to carry out process 900, but implementations of the process 900 are not limited to the hardware and software combination of the computing system 502. In further embodiments, the process 900 may be implemented exclusively in hardware and/or firmware. Additional details regarding each of the operations of the method may be understood according to the description the computing system 502, as described above. The process 900 is described with respect to specific hardware and software for example purposes but may be carried out via any suitable hardware and/or software capable of performing the described actions or steps. The following aspects of the process 900 may be carried out by various managers and software protocols of the computing system. In particular, the following aspects may be organized and run according to an overall assay process operated and managed by, e.g., the protocol manager 518.

In an operation 902, a SiPM is activated in a reverse biased voltage mode (also referred to as a reverse biased mode). The SiPM may be activated in the reverse biased mode via an operational input signal. For example, the SiPM input manager 512 is configured to control a power source (e.g., 502) to activate the SiPM in a reverse biased voltage mode by applying either a negative current or negative voltage to the SiPM as a reverse bias input signal. In embodiments, the SiPM may be operated with a reverse bias voltage having a magnitude that is set lower than the breakdown voltage (i.e., below Geiger mode). Because the output response of the SiPM below Geiger mode is significantly reduced compared to the Geiger mode response, heating of the SiPM during exposure to the known light source/known light intensity is minimized or eliminated.

In an operation 904, the known light source (e.g., 830) is employed to provide a specified amount of light intensity, e.g., precise number of photons, to the SiPM. The light source may be controlled by, e.g., the protocol manager 518. Exposure to the light source results in a reverse bias output signal, e.g., an output current response, from the SiPM.

In an operation 906, the SiPM response to the predetermined or known light source is measured and the reverse bias output signal of the SiPM is detected at the output monitor. The SiPM output manager is configured to control the output monitor to determine the reverse bias output signal and is configured to receive a measurement of the output current or output signal. The output signal is integrated over time to determine a total charge emitted by the SiPM in response to the photon exposure.

In an operation 908, the temperature of the SiPM is determined. As discussed above, the gain of the SiPM varies according to temperature. The gain of the SiPM can be determined or calculated according to the input reverse bias voltage, the measured total output charge, and the predetermined or known light intensity from the light source, i.e., according to Equation 8. The determined gain of the SiPM may then be compared to a pre-determined and/or pre-defined correlation between the gains and temperatures for the SiPM to determine the temperature of the SiPM. Accordingly, the temperature determination manager (e.g., 516) may determine and/or calculate the gain of the SiPM according to the reverse bias input signal, the reverse bias output signal, and the predetermined light intensity. The gain, as calculated and/or determined, may then be employed to determine the temperature of the SiPM.

In an operation 910, after a temperature is measured or determined, the power source is controlled by the SiPM input manager (e.g., 512) to apply an operational reverse bias voltage to the SiPM by an operational input signal. In embodiments, the operational reverse bias voltage has a magnitude which surpasses the breakdown voltage and thus puts the SiPM into an operational Geiger mode. The SiPM thus enters an operational reverse bias mode. Applying the operational reverse bias voltage prepares the SiPM to measure output photons from the target object. The operational reverse bias voltage to be applied is determined, e.g., by the computer system, according to the temperature dependence of the breakdown voltage so as to maintain a constant overvoltage between measurements. By selecting the operation reverse bias voltage $V_{Bias}$ according to the temperature associated with each specific measurement, the computer system protocol manager is able to ensure that the gain G remains constant.

In further embodiments, the operational reverse bias voltage may be selected to maintain a constant reverse bias voltage (and therefore a variable overvoltage) between photodetection measurements. Accordingly, the protocol manager may select a predetermined operational reverse bias voltage and apply it to the SiPM.

In an operation 912, the SiPM is exposed to light, or more specifically photons, produced during a measurement operation. In an embodiment involving assay measurements, photons may be produced during an assay process, such as electrochemiluminescence. Any test process that generates photons may be employed. For example, an assay device may be configured to expose one or more samples within sample wells of a multi-well sample plate to an electric field that causes solvent agents to produce photons, for example, by electrochemiluminescence. Exposing the SiPM to the photons results in one or more photons striking the PADS of the SiPM. As discussed above with respect to FIGS. 1 and 2, exposing the SiPM to one or more photons induces an analog output current response.

In an operation 914, the output monitor (e.g., 203) is controlled by the SiPM output manager to measure, receive, or otherwise determine a response signal, e.g., an output current response, from the SiPM in response to the incident photons. The computer system (e.g., the SiPM output manager) receives the response signal and uses the constant gain of the SiPM to determine the intensity of the light (or photons) striking the SiPM. Because the operational reverse bias voltage is selected to provide a constant overvoltage regardless of the SiPM temperature, the gain of the SiPM is maintained at a constant value. Accordingly, the intensity of the light striking the SiPM (e.g., number of photons) may be determined according to the constant gain. Accordingly, determining the light intensity (i.e. incident photon number) may be achieved by dividing the measured total charge output by the predetermined constant gain G.

In further embodiments, wherein the operational reverse bias voltage is maintained at a predetermined constant level, the measured temperature may be used to determine the gain, G according to the look-up table or equation specific to either the SiPM device or photodiodes used. The determined gain G may then be used to determine the light intensity (i.e. incident photon number) by dividing the measured total charge output by the predetermined constant gain G. The measurement of the recorded temperature immediately prior (or subsequent to) applying an operational reverse bias voltage permits an accurate determination of the output light intensity during the measurement.

The process 900 of acquiring temperature corrected assay data may be performed, in some embodiments, according to the operations 902-912 in the order that they are described above. In further embodiments, the process 900 may include more or fewer operations than the above described operations 902-912, may include the operations in a different order, and/or may include some operations multiple times.

For example, in some embodiments, the temperature of the SiPM may be measured after photodetection data is captured. In further embodiments, the temperature of the SiPM may be measured both before and after the photodetection data is captured. In such embodiments, the operational reverse bias voltage (and not the overvoltage) is maintained as a constant. The before and after measurements may be combined to estimate the temperature during the data capture operation. Based on the temperature at the time of measurement, the gain may be computed. The gain may then be used to determine the incident light intensity.

FIG. 10 is a flow chart illustrating a method of acquiring temperature corrected photodetection data. FIG. 10 illustrates a process 1000 of acquiring temperature corrected photodetection data employing a temperature determination made by the computing system when operating the SiPM under reverse bias conditions. The process 1000 is performed by one or more computer systems, such as computer system 502, having one or more physical processors programmed with computer program instructions that, when executed by the one or more physical processors, cause the computer system to perform the method. The process 1000 is further performed with the use of one or more light detection devices, such as the light detection device 301 or the light detection device 801. In embodiments, the process 1000 is carried out via one or more computing systems 502 and a light detection device as described herein. Although described with respect to the particular assay devices and SiPM described herein, the process 1000 is not limited to such and may be employed with any suitable light detection device or SiPM device, including assay devices and systems.

The computing system 502 represents an example of a hardware and software combination configured to carry out process 1000, but implementations of the process 1000 are not limited to the hardware and software combination of the computing system 502. In further embodiments, the process 1000 may be implemented exclusively in hardware and/or firmware. Additional details regarding each of the operations of the method may be understood according to the description the computing system 502, as described above. The process 1000 is described with respect to specific hardware and software for example purposes but may be carried out via any suitable hardware and/or software capable of performing the described actions or steps. The following aspects of the process 1000 may be carried out by various managers and software protocols of the computing system. In particular, the following aspects may be organized and run according to an overall assay process operated and managed by the protocol manager.

In an operation 1002, a SiPM is activated in a reverse bias mode below the breakdown voltage by a reverse bias input signal. The SiPM input manager is configured to control the power source (e.g., 202/802) to activate the SiPM. Activating the SiPM in the reverse bias mode includes providing a fixed bias voltage across the one or more PADs of the SiPM as the reverse bias input signal or reverse bias activation signal. A voltage having a magnitude below the reverse bias breakdown threshold is selected to reduce sensitivity to any light incident upon the SiPM within the light detection device.

In an operation 1004, the output monitor (e.g., 203/803) detects a response to the activation in the reverse bias mode (e.g., response signal). The response signal to the reverse bias activation signal is measured by the output monitor, controlled by the SiPM output manager. The response signal is, e.g., a reverse bias saturation current produced according to the fixed bias voltage. The SiPM output manager is configured to receive the response signal measure of the saturation current from the output current monitor. The saturation current is the maximum current permitted to flow through the SiPM diodes under sub-breakdown reverse bias voltages, e.g., in the saturation mode. In embodiments, SiPM diodes operating in the saturation mode may produce a very low reverse bias saturation current. Such low currents may require specialized hardware and/or software to obtain accurate measurements.

In an operation 1006, the temperature determination manager (e.g., 516) determines the temperature of the SiPM according to a relationship between the saturation current and the temperature. The saturation current $I_S$ may be determined by Equation 9.

$$I_s = AT^{\frac{3}{n}} * \exp\left(-\frac{E_g}{nk_BT}\right) \quad \text{Equation 9}$$

In Equation 9, A is a constant for a given SiPM, $E_g$ is the semiconductor bandgap, $k_B$ is Boltzmann's constant, and T is temperature in degrees Kelvin. Accordingly, the computing system may determine the temperature T based on the measured saturation current $I_S$ and the equation constants. In some embodiments, in the reverse bias saturation mode, a leakage current separate from the reverse bias saturation current may also be produced. Depending on diode characteristics, the leakage current may vary in amperage. Accurate measurement of the reverse bias saturation current may require accounting for the leakage current.

In an operation 1008, after a temperature T is determined or calculated based on the measured saturation current, the power source (e.g., 202) is employed by the SiPM input manager to apply an operational reverse bias voltage to the one or more PADs of the SiPM as an operational input signal. The operational reverse bias voltage is a voltage with a magnitude that surpasses the breakdown voltage of the SiPM. Applying the operational reverse bias voltage prepares the SiPM to measure output photons from samples during an assay process. The SiPM thus enters an operational reverse bias mode. The operational reverse bias voltage to be applied may be determined, e.g., by the computer system, according to the temperature dependence of the breakdown voltage so as to maintain a constant overvoltage between measurements. By selecting the operation reverse bias voltage $V_{Bias}$ according to the temperature associated with each specific measurement, the computer system protocol manager is able to ensure that the gain G remains constant.

In further embodiments, the operational reverse bias voltage may be selected to maintain a constant reverse bias voltage (and therefore a variable overvoltage) between photodetection measurements. Accordingly, the protocol manager may select a predetermined operational reverse bias voltage and apply it to the SiPM. In such embodiments, the gain G is not constant and must be determined or calculated for each measurement according to the overvoltage.

In an operation 1010, the SiPM 200 is exposed to photons produced during aa photodetection process. Any test process that generates photons may be employed, including assay processes. Exposing the SiPM to the photons results in one or more photons striking the PADs of the SiPM. As discussed above with respect to FIGS. 2 and 3, exposing the SiPM to one or more photons induces an analog output current response.

In an operation 1012, the SiPM output manager measures, receives, or otherwise determines an assay response signal from the SiPM in response to the incident photons. The computer system (e.g., the SiPM output manager) receives the assay response signal and uses the known, constant, gain of the SiPM to determine the intensity of the light (or photons) striking the SiPM. Because the operational reverse bias voltage is selected to provide a constant overvoltage regardless of the SiPM temperature, the gain of the SiPM is maintained at a constant value. Accordingly, the intensity of the light striking the SiPM (e.g., number of photons) may be determined according to the constant gain. Accordingly, determining the light intensity (i.e. incident photon number) may be achieved by dividing the measured total charge output by the predetermined constant gain G.

In further embodiments, wherein the operational reverse bias voltage is maintained at a predetermined constant level (resulting in a variable overvoltage), the measured temperature may be used to determine the variable overvoltage and thus the gain, G according to appropriately stored data and/or the appropriate equations as discussed herein. The determined gain G may then be used to determine the light intensity (i.e. incident photon number) by dividing the measured total charge output by the predetermined constant gain G. The measurement of the recorded temperature immediately prior (or subsequent to) applying an operational reverse bias voltage permits an accurate determination of the output light intensity during the measurement.

The process 1000 of acquiring temperature corrected assay data may be performed, in some embodiments, according to the operations 1002-1012 in the order that they are described above. In further embodiments, the process 1000 may include more or fewer operations than the above described operations 1002-1012, may include the operations in a different order, and/or may include some operations multiple times.

For example, in some embodiments, the temperature of the SiPM may be measured after photodetection data is captured. In further embodiments, the temperature of the SiPM may be measured both before and after the photodetection data is captured. In such embodiments, the operational reverse bias voltage (and not the overvoltage) is maintained as a constant. The before and after measurements may be combined to estimate the temperature during the data capture operation. Based on the temperature at the time of measurement, the gain may be computed. The gain may then me used to determine the incident light intensity.

As described above with respect to FIG. 10, various equations may be employed in determining of a SiPM temperature based on measurements made in a reverse bias voltage mode and adjusting or accounting for the determined temperature. In the reverse bias voltage mode, as described above, the SiPM may function as a thermometer. The method discussed above and with respect to the given equations is provided by way of example only. In further embodiments, the given equations may be modified as necessary according to the specific components of a SiPM device being used. For example, use of different diodes and/or different circuitry within a SiPM may necessitate the modification of the selected equations. In further embodiments, correlations and/or look-up tables that provide correlations between the operative circuit parameters and temperature, as described above, may be employed in place of specific equations. In embodiments, such correlations and/or look up table may be employed in either or both of determining temperature based on a forward bias voltage input and accounting for temperature when making a SiPM measurement under reverse bias conditions. Such correlations and/or look-up tables may be established, for example, based on the equations described above and/or based on modified versions of these equations. In further embodiments, such correlations and/or look-up tables may be established experimentally.

Figure 11:
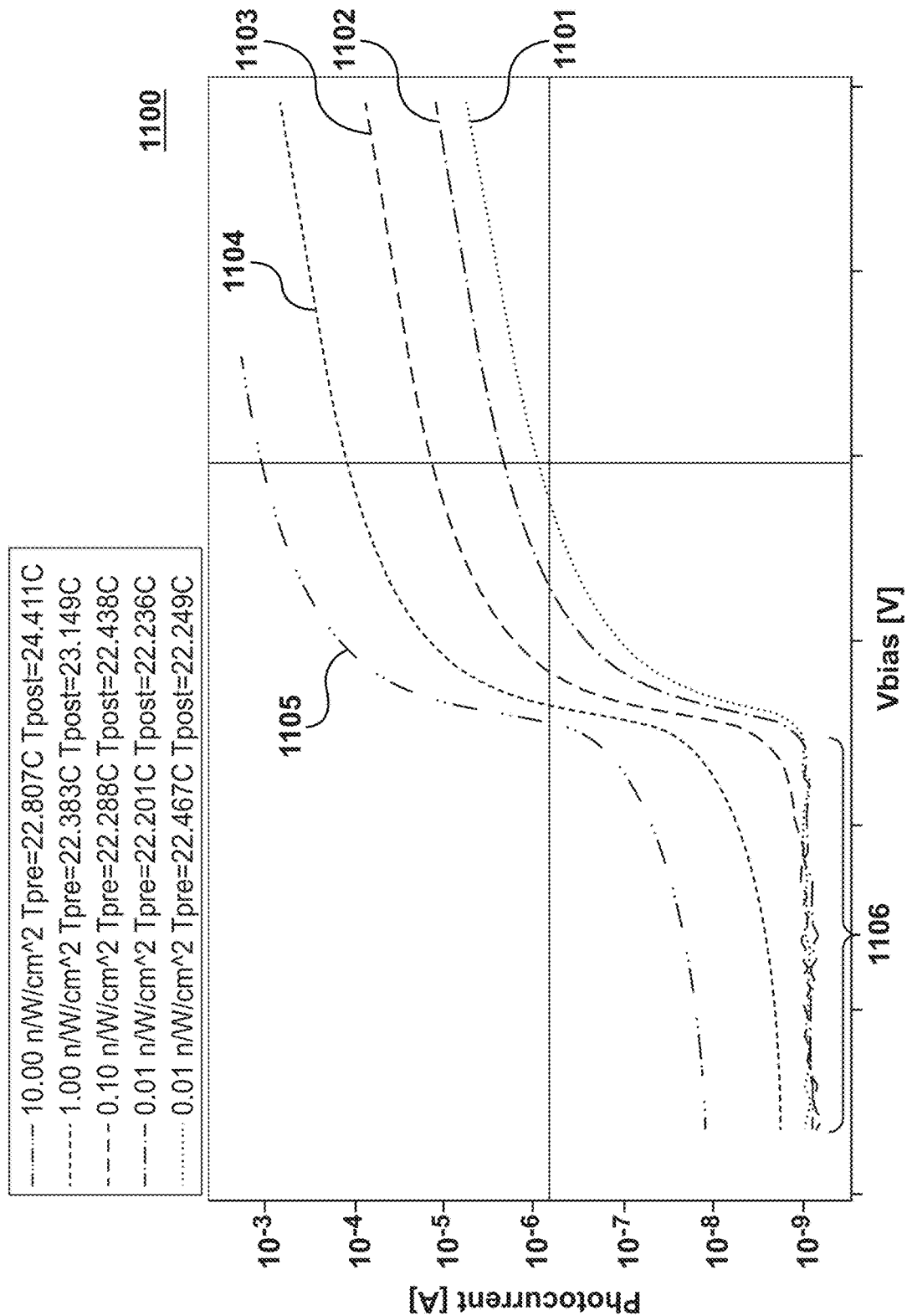
FIG. 11 shows a graph illustrating temperature dependence of a SiPM in a reverse bias mode.

A potential concern when using a reverse bias voltage to determine temperature of a SiPM is light sensitivity. Because the SiPM may be sensitive to light in a reverse bias mode, ambient light striking the SiPM during a reverse bias temperature measurement may skew the results. FIG. 11 illustrates a graph 1100 showing several diode voltage/current response curves 1101-1105 when subject to levels of incident light varying between 0.00 nW/cm$^2$ and 10.00 nW/cm$^2$. As shown in FIG. 11, when subject to incident light at 0.10 nW/cm$^2$ and below (curves 1101, 1102, and 1103), the saturation current in the saturation mode 1106 is stable and relatively insensitive to the varying levels of incident light. At light levels of 1.00 nW/cm$^2$ and above (e.g., curves 1104, 1105), the saturation current shows greater sensitivity to the incident light. Thus, distortions due to potential light sensitivity during a reverse bias mode temperature measurement may be reduced or alleviated by ensuring that potential ambient light incident on the PADs of the SiPM remains below a certain level.

The foregoing represents embodiments applicable to temperature correction in any type of light detection device employing a SiPM. In further specific embodiments, the foregoing embodiments related to temperature correction in light detection devices may be employed in sample assay devices employing SiPMs.

Assay devices consistent with the present disclosure include a variety of assay devices and/or formats. The assay devices may include various components (assay system components), e.g., assay modules, such as assay plates, cartridges, multi-well assay plates, reaction vessels, test tubes, cuvettes, flow cells, assay chips, lateral flow devices, etc., having assay reagents (which may include targeting agents or other binding reagents) added as the assay progresses or pre-loaded in the wells, chambers, or assay regions of the assay module. These devices may employ a variety of assay approaches for measuring the presence, amount, or activity of a target analyte.

Assay devices, as described herein, are configured to perform sample assays on one or more test samples each having an unknown quantity of an analyte. Performing a sample assay on a test sample generates a sample assay signal value. The sample assay signal value is indicative of the unknown quantity of the analyte associated therewith. In embodiments, multiple sample assay signal values may be obtained to correspond to a single test sample of unknown analyte quantity. That is, a test sample may be measured multiple times.

Assay methods disclosed herein may be performed manually, using automated technology, or both. Automated technology may be partially automated, e.g., one or more modular instruments, or a fully integrated, automated instrument.

Assay devices may include manual and/or automated systems (modules and fully integrated) on which the methods herein may be carried out and may include one or more of the following automated subsystems: computer subsystem(s) that may comprise hardware (e.g., personal computer, laptop, hardware processor, disc, keyboard, display, printer), software (e.g., processes such as drivers, driver controllers, and data analyzers), and database(s); liquid handling subsystem(s), e.g., sample handling and reagent handling, e.g., robotic pipetting head, syringe, stirring apparatus, ultrasonic mixing apparatus, magnetic mixing apparatus; sample, reagent, and consumable storing and handling subsystem(s), e.g., robotic manipulator, tube or lid or foil piercing apparatus, lid removing apparatus, conveying apparatus such as linear and circular conveyors and robotic manipulators, tube racks, plate carriers, trough carriers, pipette tip carriers, plate shakers; centrifuges, assay reaction subsystem(s), e.g., fluid-based and consumable-based (such as tube and multi well plate); container and consumable washing subsystem(s), e.g., plate washing apparatus; magnetic separator or magnetic particle concentrator subsystem(s), e.g., flow cell, tube, and plate types; cell and particle detection, classification and separation subsystem(s), e.g., flow cytometers and Coulter counters; detection subsystem(s) such as colorimetric, nephelometric, fluorescence, and ECL detectors; temperature control subsystem(s), e.g., air handling, air cooling, air warming, fans, blowers, water baths; waste subsystem(s), e.g., liquid and solid waste containers; global unique identifier (GUI) detecting subsystem(s) e.g., 1D and 2D bar-code scanners such as flat bed and wand types; sample identifier detection subsystem(s), e.g., 1D and 2D bar-code scanners such as flat bed and wand types. Analytical subsystem(s), e.g., chromatography systems such as high-performance liquid chromatography (HPLC), fast-protein liquid chromatography (FPLC), and mass spectrometer can also be modules or fully integrated. Automated systems consistent with embodiments hereof may be controlled and/or managed by a user interface manager.

Systems or modules that perform sample identification and preparation may be combined with (or be adjoined to or adjacent to or robotically linked or coupled to) systems or modules that perform assays and that perform detection or that perform both. Multiple modular systems of the same kind may be combined to increase throughput. Modular system(s) may be combined with module(s) that carry out other types of analysis such as chemical, biochemical, and nucleic acid analysis. Automated systems may allow batch, continuous, random-access, and point-of-care workflows and single, medium, and high sample throughput.

Automated systems consistent with embodiments hereof be configured to perform one or more of the following functions: (a) moving consumables such as plates into, within, and out of the detection subsystem, (b) moving consumables between other subsystems, (c) storing the consumables, (d) sample and reagent handling (e.g., adapted to mix reagents and/or introduce reagents into consumables), (e) consumable shaking (e.g., for mixing reagents and/or for increasing reaction rates), (f) consumable washing (e.g., washing plates and/or performing assay wash steps (e.g., well aspirating)), and (g) measuring an assay signal (for example, an ECL signal) in a flow cell or a consumable such as a tube or a plate. The automated system may be configured to handle individual tubes placed in racks, multi-well plates such as 96 or 384 well plates.

In embodiments, the automated system is fully automated, is modular, is computerized, performs in vitro quantitative and qualitative tests on a wide range of analytes and performs photometric assays, ion-selective electrode measurements, and/or electrochemiluminescence (ECL) assays. In embodiments, an automated system includes the following hardware units: a control unit, a core unit and at least one analytical module.

In embodiments, the control unit, which may be a local assay computing system and/or a networked computing system, uses a graphical user interface to control all instrument functions, and is comprised of a readout device, such as a monitor, an input device(s), such as keyboard and mouse, and a personal computer using, e.g., a Windows operating system. In embodiments, the core unit is comprised of several components that manage conveyance of samples to each assigned analytical module. The actual composition of the core unit depends on the configuration of the analytical modules, which can be configured by one of skill in the art using methods known in the art. In embodiments, the core unit includes at least the sampling unit and one rack rotor as main components. Conveyor line(s) and a second rack rotor are possible extensions. Several other core unit components can include the sample rack loader/unloader, a port, a barcode reader (for racks and samples), a water supply and a system interface port. In embodiments, the analytical module conducts ECL assays and includes a reagent area, a measurement area, a consumables area and a pre-clean area.

FIG. 12 illustrates an embodiment of an assay device 101 consistent with embodiments herein. The methods of the present embodiments may be used in conjunction with a variety of assay devices 101 and/or formats as discussed above. The assay device 101 represents one example of a platform suitable for employing the methods, systems, and devices disclosed herein. In embodiments, assay devices 101 as disclosed herein include one or more SiPM devices, such as the SiPM 200 or the SiPM 800 configured to capture optical signals from one or more samples during one or more assay steps. Although specific assay devices 101 may be disclosed herein, embodiments hereof may be employed with any suitable assay device employing a SiPM. Although specific assay devices are pictured and described, the methods and systems described herein may be employed with any suitable assay device, system, or method.

In an embodiment, the assay device 101 is provided for conducting luminescence assays in multi-well plates. For instance, an embodiment of the assay device 101 includes the SiPM 200 including PADs 201 (not shown), the power source 202, and the output current monitor 203. The assay device may further incorporate the computer system 502. Additionally, the assay device 101 may further include a plate handling subsystem 405, including a light-tight enclosure 410 that provides a light-free environment in which luminescence measurements can be carried out. The light-tight enclosure 410 may surround a plate carriage 420 actuated by a plate carriage actuator 450 and configured to hold a multi-well plate 400.

The plate carriage 420 is configured for x-y translation when actuated by the plate carriage actuator 450, which may include, e.g. a stepper motor, linear drive, and/or any other suitable electromechanical actuator. The plate carriage actuator 450 may be actuated or controlled by the computer system 502 (e.g., by protocol manager 518), to translate the plate carriage 420 so as to suitably arrange the multi-well plate 400 with respect to the SiPM 200 for photodetection measurements.

The SiPM 200 is arranged to oppose one or more samples within the light-tight housing 410 of the assay device 101. The one or more samples may be contained within, for example, the multi-well plate 400 illustrated in FIG. 12. The multi-well plate 400 is disposed on a plate carriage 420 actuated by a plate carriage actuator 450. The SiPM 200 is configured and arranged so as to receive light (e.g., visible light) emitted from samples in the multi-well plate 400 during performance of an assay, such as an electrochemiluminescence (ECL) assay, fluorescence assay, and/or chemiluminescence assay. The SiPM 200 is arranged to receive a voltage input via power source 202 (e.g., to activate the SiPM 200 in a forward bias mode or in a reverse bias mode) and to generate an output signal that may be detected or monitored by the output monitor 203, as discussed above.

During performance of an assay, the SiPM receives or is exposed to light emitted from one of the samples contained in the multi-well plate 400. To achieve a high throughput, multiple samples may consecutively be excited so as to cause a photonic emission. Thus, the SiPM 200 receives consecutive emissions from the samples in the multi-well plate 400. Power supplied to the SiPM 200 and the conduction of high currents causes the SiPM 200 to heat up. As the SiPM 200 is repeatedly operated to obtain data from each of the multiple samples in the multi-well plate 400, the temperature of the SiPM 200 may rise throughout performance of the assay. Because higher intensity light sources cause larger current outputs, temperature rises may be proportional or otherwise related to the intensity of the light source.

Temperature rises of the SiPM 200 may be accounted for, calibrated for, and/or otherwise compensated for according to the methods and systems described herein, for example, the methods associated with FIGS. 6, 9, and 10. Each of these methods may be adapted to be carried out by or in conjunction with an assay system or assay device. The various assay steps and tasks may be included among the previously discussed steps of the aforementioned methods as appropriate for the performance of the sample assays.

For example, as discussed above, each of methods 600, 900, and 1000 may include an operation of exposing a SiPM to incident photons. In methods consistent with a assay systems and devices, the incident photons may be generated via assay steps, e.g., such as an electrochemiluminescence (ECL) assay, fluorescence assay, and/or chemiluminescence assay. Accordingly, each of the above discussed methods 600, 900, and 1000 may include an assay operation configured to cause the emission of photons from an assay sample. The subsequently emitted photons may be captured by a SiPM associated with the assay device/system in the above-detailed photon exposure step.

In another example, operations of the above methods 600, 900, 1000 may further include operations to determine assay values based on computed, measured, and/or determined light intensity values. As discussed above, light intensity values may be computed, measured, and/or determined based on the SiPM response to incident light photons. The light intensity values may, in turn, be used to determine assay values, e.g., values associated with the performance of assays on samples. The methods 600, 900, and 1000 may include assay operations configured to cause generation of photons based on assay operations. Measurements of these photons via SiPM may be employed to calculate, determine, compute, and/or measure assay values associated with the assay operations.

The methods 600, 900, and 1000 may further include any and all operations necessary for the performance of assays, and the measurement, computation, determination, and tabulation of assay results. Each of these operations may be controlled, facilitated, and/or managed by a computer system associated with an assay device or system and/or by personnel operating the assay device or system. Such operations may include but are not limited to, sample deposition, reagent and reactant handling and distribution, plate moving and transfer operations, applying electrical fields, currents, and voltages, causing electrochemical reactions, etc. Examples of instruments consistent with embodiments hereof and operations carried out by such instruments may be found, e.g., as disclosed in U.S. Application No. PCT/US2016/043755, filed on Jul. 22, 2016; U.S. Application No. PCT/US2017/014360, filed on Jan. 20, 2017; and U.S. Application No. 63/025,344, filed on May 15, 2020. In other examples, high throughput instruments, such as, for example those disclosed in U.S. Application No. PCT/US2016/026242, filed on Apr. 6, 2016; and U.S. Application No. PCT/US2019/032567, filed on May 16, 2019. Other examples of instruments consistent with embodiments herein include, for example U.S. Application No. PCT/US02/20570, filed on Jun. 29, 2002; U.S. Application No. PCT/US2006/049049, filed on Dec. 21, 2006; U.S. Application No. PCT/US2014/010182, filed on Jan. 3, 2014; and U.S. Application No. 62/954,961, filed on Dec. 30, 2019. SiPMs consistent with embodiments hereof may be used for any assay format that involves light detection, such as assays employing measurements based on absorbance, fluorescence, chemiluminescence, electrochemiluminescence, light scattering, etc. SiPMs may be used for light detection in binding assays such as immunoassays or nucleic acid assays, chemical assays, enzymatic assays, and others. For example, methods and devices disclosed herein may be consistent with assays and equipment disclosed in, e.g., U.S. Application No. PCT/US20/30754, filed on Apr. 30, 2020, U.S. Application No. PCT/US2014/026010, filed on Mar. 13, 2014, U.S. Application No. PCT/US2014/022948, filed on Mar. 11, 2014; U.S. Application No. PCT/US2015/03092, filed on May 15, 2015 and U.S. Application No. PCT/US2014/010016, filed on Jan. 2, 2014. Each of the prior application discussed in this paragraph are incorporated herein by reference in their entireties. Additional embodiments consistent with the present disclosure include the following.

Embodiment 1 is a method for obtaining temperature corrected photometric data by a silicon photomultiplier device, the method comprising: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

Embodiment 2 includes the features of embodiment 1 and further includes determining the operational reverse bias mode voltage according to the temperature required to maintain a predetermined silicon photomultiplier device gain in the silicon photomultiplier device.

Embodiment 3 includes the features of embodiments 1 or 2 and further includes determining the silicon photomultiplier device gain according to the temperature and the operational reverse bias mode voltage.

Embodiment 4 includes the features of embodiments 1-3, wherein activating the silicon photomultiplier device includes applying a fixed current as the forward bias mode input signal.

Embodiment 5 includes the features of embodiments 1-4, wherein activating the silicon photomultiplier device in the forward bias mode includes applying a fixed voltage as the forward bias mode input signal.

Embodiment 6 includes the features of embodiments 1-5, further comprising determining the temperature of the silicon photomultiplier device by employing a correlation between a diode voltage and a diode current in the forward bias mode.

Embodiment 7 includes the features of embodiments 1-6, wherein determining the temperature includes determining a first temperature prior to exposing the silicon photomultiplier device to the light and determining a second temperature after exposing the silicon photomultiplier device to the light.

Embodiment 8 includes the features of embodiments 1-7, wherein the target object includes at least one sample contained in a sample well of a multi-well plate, the method further comprising: activating the sample well to cause a luminescent reaction in the at least one sample to produce the light.

Embodiment 9 includes the features of embodiments 1-8, wherein the luminescent reaction includes a chemiluminescent reaction.

Embodiment 10 includes the features of embodiments 1-9, wherein the chemiluminescent reaction includes an electrochemiluminescent reaction.

Embodiment 11 includes the features of embodiments 1-10, wherein the target object includes at least one sample contained in a sample well of a multi-well plate, the method further comprising: determining an assay measurement according to the intensity of the light.

Embodiment 12 includes the features of embodiments 1-11, wherein the forward bias mode input signal is a first forward bias mode input signal and the forward bias mode response signal is a first forward bias mode response signal, the method further comprising: activating the silicon photomultiplier device in the forward bias mode by a second forward bias mode input signal; measuring, by at least one processor, a second forward bias mode response signal, and wherein determining the temperature of the silicon photomultiplier device according to the forward bias mode input signal and the forward bias mode response signal includes determining the temperature of the silicon photomultiplier device according to the first forward bias mode input signal, the first forward bias mode response signal, the second forward bias mode input signal, and the second forward bias mode response signal.

Embodiment 13 includes a method for obtaining temperature corrected photometric data by a silicon photomultiplier device, the method comprising: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 14 includes the features of embodiment 13, further comprising determining the operational reverse bias mode voltage according to the temperature to maintain a predetermined silicon photomultiplier device gain in the silicon photomultiplier device.

Embodiment 15 includes the features of embodiments 13 or 14, further comprising determining the silicon photomultiplier device gain according to the temperature.

Embodiment 16 includes the features of embodiments 13-15, wherein activating the silicon photomultiplier device includes applying a fixed bias voltage as the reverse bias input signal to cause the silicon photomultiplier device to operate in a saturation mode.

Embodiment 17 includes the features of embodiments 13-16, wherein determining the temperature of the silicon photomultiplier device is performed by employing a correlation between the temperature and the reverse bias mode saturation current in the reverse bias mode.

Embodiment 18 includes the features of embodiments 13-17, wherein determining the temperature includes determining a first temperature prior to exposing the silicon photomultiplier device to the light and determining a second temperature after exposing the silicon photomultiplier device to the light.

Embodiment 19 includes the features of embodiments 13-18, wherein the target object includes at least one sample contained in a sample well of a multi-well plate, the method further comprising: activating the sample well to cause a luminescent reaction in the at least one sample to produce the light.

Embodiment 20 includes the features of embodiments 13-19, wherein the luminescent reaction includes a chemiluminescent reaction.

Embodiment 21 includes the features of embodiments 13-20, wherein the chemiluminescent reaction includes an electrochemiluminescent reaction.

Embodiment 22 includes the features of embodiments 13-21, wherein the target object includes at least one sample contained in a sample well of a multi-well plate, the method further comprising: determining an assay measurement according to the intensity of the light.

Embodiment 23 includes a method for obtaining temperature corrected photometric data by a silicon photomultiplier device, the method comprising: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 24 includes the features of embodiment 23, further comprising determining the operational reverse bias mode voltage according to the temperature to maintain a predetermined silicon photomultiplier device gain in the silicon photomultiplier device.

Embodiment 25 includes the features of embodiments 23 or 24, further comprising determining the silicon photomultiplier device gain according to the temperature and the operational reverse bias mode voltage.

Embodiment 26 includes the features of embodiments 23-25, wherein activating the silicon photomultiplier device includes applying a fixed current as the reverse bias input signal.

Embodiment 27 includes the features of embodiments 23-26, wherein activating the silicon photomultiplier device includes applying a fixed voltage as the reverse bias input signal.

Embodiment 28 includes the features of embodiments 23-27, wherein determining the temperature of the silicon photomultiplier device includes: determining a gain of the silicon photomultiplier device when exposed to the predetermined light intensity; and determining the temperature of the silicon photomultiplier device according to the gain.

Embodiment 29 includes the features of embodiments 23-28, wherein determining the temperature includes determining a first temperature prior to exposing the silicon photomultiplier device to the light and determining a second temperature after exposing the silicon photomultiplier device to the light.

Embodiment 30 includes the features of embodiments 23-29, wherein the target object includes at least one sample contained in a sample well of a multi-well plate, the method further comprising: activating the sample well to cause a luminescent reaction in the at least one sample to produce the light.

Embodiment 31 includes the features of embodiments 23-30, wherein the luminescent reaction includes a chemiluminescent reaction.

Embodiment 32 includes the features of embodiments 23-31, wherein the chemiluminescent reaction includes an electrochemiluminescent reaction.

Embodiment 33 includes the features of embodiments 23-32, wherein the target object includes at least one sample contained in a sample well of a multi-well plate, the method further comprising: determining an assay measurement according to the intensity of the light.

Embodiment 34 includes a method for determining a temperature of a silicon photomultiplier device, the method comprising: activating the silicon photomultiplier device in a reverse bias mode by a reverse bias input signal; exposing the silicon photomultiplier device to a predetermined light intensity; measuring a reverse bias output signal from the silicon photomultiplier device; determining a gain of the silicon photomultiplier device according to the reverse bias input signal, the reverse bias output signal, and the predetermined light intensity when exposed to the predetermined light intensity; and determining the temperature of the silicon photomultiplier device according to the gain.

Embodiment 35 includes the features of embodiment 34, wherein activating the silicon photomultiplier device includes applying a fixed current as the reverse bias input signal.

Embodiment 36 includes the features of embodiments 34-35, wherein activating the silicon photomultiplier device includes applying a fixed voltage as the reverse bias input signal.

Embodiment 37 includes the features of embodiments 34-36, further comprising activating the silicon photomultiplier device in an operational reverse bias mode to obtain an assay measurement based on the temperature.

Embodiment 38 includes a system for obtaining temperature corrected photometric data, the system comprising: a silicon photomultiplier device including a plurality of photoavalanche diodes; and at least one processor configured with software instructions for: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

Embodiment 39 includes the features of embodiment 38, wherein the at least one processor is further configured for determining the operational reverse bias mode voltage according to the temperature required to maintain a predetermined silicon photomultiplier device gain in the silicon photomultiplier device.

Embodiment 40 includes the features of embodiment 38-39, wherein the at least one processor is further configured for determining the silicon photomultiplier device gain according to the temperature.

Embodiment 41 includes the features of embodiment 38-40, wherein activating the silicon photomultiplier device includes applying a fixed current as the forward bias mode input signal.

Embodiment 42 includes the features of embodiment 38-41, wherein activating the silicon photomultiplier device in the forward bias mode includes applying a fixed voltage as the forward bias mode input signal.

Embodiment 43 includes the features of embodiment 38-42, wherein the at least one processor is further configured for determining the temperature of the silicon photomultiplier device by employing a correlation between a diode voltage and a diode current in the forward bias mode.

Embodiment 44 includes the features of embodiment 38-43, wherein determining the temperature includes determining a first temperature prior to exposing the silicon photomultiplier device to the light and determining a second temperature after exposing the silicon photomultiplier device to the light.

Embodiment 45 includes the features of embodiment 38-44, wherein the target object includes at least one sample contained in a sample well of a multi-well plate, the method further comprising: activating the sample well to cause an electrochemiluminescent reaction in the at least one sample to produce the light.

Embodiment 46 includes the features of embodiment 38-45, wherein the luminescent reaction includes a chemiluminescent reaction.

Embodiment 47 includes the features of embodiment 38-46, wherein the chemiluminescent reaction includes an electrochemiluminescent reaction.

Embodiment 48 includes the features of embodiment 38-47, wherein the target object includes at least one sample contained in a sample well of a multi-well plate, the method further comprising: determining an assay measurement according to the intensity of the light.

Embodiment 49 includes a system for obtaining temperature corrected photometric data, the system comprising: a silicon photomultiplier device including a plurality of photoavalanche diodes; and at least one processor configured with software instructions for: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 50 includes the features of embodiment 49, wherein the at least one processor is further configured for determining the operational reverse bias mode voltage according to the temperature to maintain a predetermined silicon photomultiplier device gain in the silicon photomultiplier device.

Embodiment 51 includes the features of embodiment 49-50, wherein the at least one processor is further configured for determining the silicon photomultiplier device gain according to the temperature.

Embodiment 52 includes the features of embodiment 49-51, wherein activating the silicon photomultiplier device includes applying a fixed bias voltage as the reverse bias input signal to cause the silicon photomultiplier device to operate in a saturation mode.

Embodiment 53 includes the features of embodiment 49-52, wherein determining the temperature of the silicon photomultiplier device is performed by employing a correlation between the temperature and the reverse bias mode saturation current in the reverse bias mode.

Embodiment 54 includes the features of embodiment 49-53, wherein determining the temperature includes determining a first temperature prior to exposing the silicon photomultiplier device to the light and determining a second temperature after exposing the silicon photomultiplier device to the light.

Embodiment 55 includes the features of embodiment 49-54, wherein the target object includes at least one sample contained in a sample well of a multi-well plate, the method further comprising: activating the sample well to cause an electrochemiluminescent reaction in the at least one sample to produce the light.

Embodiment 56 includes the features of embodiment 49-55, wherein the luminescent reaction includes a chemiluminescent reaction.

Embodiment 57 includes the features of embodiment 49-56, wherein the chemiluminescent reaction includes an electrochemiluminescent reaction.

Embodiment 58 includes the features of embodiment 49-57, wherein the target object includes at least one sample contained in a sample well of a multi-well plate, the method further comprising: determining an assay measurement according to the intensity of the light.

Embodiment 59 includes a system for obtaining temperature corrected photometric data, the system comprising: a silicon photomultiplier device including a plurality of photo-avalanche diodes; and at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 60 includes the features of embodiment 59, wherein the at least one processor is further configured for determining the operational reverse bias mode voltage according to the temperature to maintain a predetermined silicon photomultiplier device gain in the silicon photomultiplier device.

Embodiment 61 includes the features of embodiment 59-60, wherein the at least one processor is further configured for determining the silicon photomultiplier device gain according to the temperature.

Embodiment 62 includes the features of embodiment 59-61, wherein activating the silicon photomultiplier device includes applying a fixed current as the reverse bias input signal.

Embodiment 63 includes the features of embodiment 59-62, wherein activating the silicon photomultiplier device includes applying a fixed voltage as the reverse bias input signal.

Embodiment 64 includes the features of embodiment 59-63, wherein determining the temperature of the silicon photomultiplier device includes: determining a gain of the silicon photomultiplier device when exposed to the predetermined light intensity; and determining the temperature of the silicon photomultiplier device according to the gain.

Embodiment 65 includes the features of embodiment 59-64, wherein determining the temperature includes determining a first temperature prior to exposing the silicon photomultiplier device to the light and determining a second temperature after exposing the silicon photomultiplier device to the light.

Embodiment 66 includes the features of embodiment 59-65, wherein the target object includes at least one sample contained in a sample well of a multi-well plate, the method further comprising: activating the sample well to cause an electrochemiluminescent reaction in the at least one sample to produce the light.

Embodiment 67 includes the features of embodiment 59-66, wherein the luminescent reaction includes a chemiluminescent reaction.

Embodiment 68 includes the features of embodiment 59-67, wherein the chemiluminescent reaction includes an electrochemiluminescent reaction.

Embodiment 69 includes the features of embodiment 59-68, wherein the target object includes at least one sample contained in a sample well of a multi-well plate, the method further comprising: determining an assay measurement according to the intensity of the light.

Embodiment 70 includes a system for obtaining temperature corrected photometric data, the system comprising: a silicon photomultiplier device including a plurality of photo-avalanche diodes; and at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a gain of the silicon photomultiplier device according to the reverse bias input signal, the reverse bias output signal, and the predetermined light intensity when exposed to the predetermined light intensity; and determining the temperature of the silicon photomultiplier device according to the gain.

Embodiment 71 includes the features of embodiment 70, wherein activating the silicon photomultiplier device includes applying a fixed current as the reverse bias input signal.

Embodiment 72 includes the features of embodiments 70-71, wherein activating the silicon photomultiplier device includes applying a fixed voltage as the reverse bias input signal.

Embodiment 73 includes the features of embodiments 70-72, wherein the at least one processor is further configured for activating the silicon photomultiplier device in an operational reverse bias mode to obtain an assay measurement based on the temperature.

Embodiment 74 includes a non-transitory computer-readable medium configured with software instructions to cause execution of a method by at least one processor, the method comprising: activating the silicon photomultiplier device in a forward bias mode by a forward bias mode input signal; measuring, by at least one processor, a forward bias mode response signal; determining, by the at least one processor, a temperature of the silicon photomultiplier device according to the forward bias mode input signal and the forward bias mode response signal; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the output signal and a silicon photomultiplier device gain.

Embodiment 75 includes the features of embodiment 74, wherein the method further comprises determining the operational reverse bias mode voltage according to the temperature required to maintain a predetermined silicon photomultiplier device gain in the silicon photomultiplier device.

Embodiment 76 includes the features of embodiments 74-75, wherein the method further comprises determining the silicon photomultiplier device gain according to the temperature.

Embodiment 77 includes the features of embodiments 74-76, wherein activating the silicon photomultiplier device includes applying a fixed current as the forward bias mode input signal.

Embodiment 78 includes the features of embodiments 74-77, wherein activating the silicon photomultiplier device in the forward bias mode includes applying a fixed voltage as the forward bias mode input signal.

Embodiment 79 includes the features of embodiments 74-78, wherein the method further comprises determining the temperature of the silicon photomultiplier device by employing a correlation between a diode voltage and a diode current in the forward bias mode.

Embodiment 80 includes the features of embodiments 74-79, wherein determining the temperature includes determining a first temperature prior to exposing the silicon photomultiplier device to the light and determining a second temperature after exposing the silicon photomultiplier device to the light.

Embodiment 81 includes the features of embodiments 74-80, wherein the target object includes at least one sample contained in a sample well of a multi-well plate, the method further comprising: activating the sample well to cause an electrochemiluminescent reaction in the at least one sample to produce the light.

Embodiment 82 includes the features of embodiments 74-81, wherein the luminescent reaction includes a chemiluminescent reaction.

Embodiment 83 includes the features of embodiments 74-82, wherein the chemiluminescent reaction includes an electrochemiluminescent reaction.

Embodiment 84 includes the features of embodiments 74-83, wherein the target object includes at least one sample contained in a sample well of a multi-well plate, the method further comprising: determining an assay measurement according to the intensity of the light.

Embodiment 85 includes a non-transitory computer-readable medium configured with software instructions to cause execution of a method by at least one processor, the method comprising: activating the silicon photomultiplier device in a reverse bias mode by a reverse bias input signal; measuring, by at least one processor, a reverse bias mode saturation current; determining, by the at least one processor, a temperature of the silicon photomultiplier device according to the reverse bias mode saturation current; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 86 includes the features of embodiment 85, wherein the method further comprises determining the operational reverse bias mode voltage according to the temperature to maintain a predetermined silicon photomultiplier device gain in the silicon photomultiplier device.

Embodiment 87 includes the features of embodiments 85-86, wherein the method further comprises determining the silicon photomultiplier device gain according to the temperature.

Embodiment 88 includes the features of embodiments 85-87, wherein activating the silicon photomultiplier device includes applying a fixed bias voltage as the reverse bias input signal to cause the silicon photomultiplier device to operate in a saturation mode.

Embodiment 89 includes the features of embodiments 85-88, wherein determining the temperature of the silicon photomultiplier device is performed by employing a correlation between the temperature and the reverse bias mode saturation current in the reverse bias mode.

Embodiment 90 includes the features of embodiments 85-89, wherein determining the temperature includes determining a first temperature prior to exposing the silicon photomultiplier device to the light and determining a second temperature after exposing the silicon photomultiplier device to the light.

Embodiment 91 includes the features of embodiments 85-90, wherein the target object includes at least one sample contained in a sample well of a multi-well plate, the method further comprising: activating the sample well to cause an electrochemiluminescent reaction in the at least one sample to produce the light.

Embodiment 92 includes the features of embodiments 85-91, wherein the luminescent reaction includes a chemiluminescent reaction.

Embodiment 93 includes the features of embodiments 85-92, wherein the chemiluminescent reaction includes an electrochemiluminescent reaction.

Embodiment 94 includes the features of embodiments 85-93, wherein the target object includes at least one sample contained in a sample well of a multi-well plate, the method further comprising: determining an assay measurement according to the intensity of the light.

Embodiment 95 includes a non-transitory computer-readable medium configured with software instructions to cause execution of a method by at least one processor, the method comprising: a silicon photomultiplier device including a plurality of photo-avalanche diodes; at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a temperature of the silicon photomultiplier device according to the reverse bias input signal, reverse bias output signal, and the predetermined light intensity; determining, by the at least one processor, an operational reverse bias mode voltage; activating the silicon photomultiplier device in an operational reverse bias mode by the operational reverse bias mode voltage; exposing the silicon photomultiplier device to light from a target object; measuring an output signal from the silicon photomultiplier device; and determining an intensity of the light according to the temperature of the silicon photomultiplier device and a silicon photomultiplier device gain.

Embodiment 96 includes the features of embodiment 95, wherein the method further comprises determining the operational reverse bias mode voltage according to the temperature to maintain a predetermined silicon photomultiplier device gain in the silicon photomultiplier device.

Embodiment 97 includes the features of embodiments 95-96, wherein the method further comprises determining the silicon photomultiplier device gain according to the temperature and the operational reverse bias mode voltage.

Embodiment 98 includes the features of embodiments 95-97, wherein activating the silicon photomultiplier device includes applying a fixed current as the reverse bias input signal.

Embodiment 99 includes the features of embodiments 95-98, wherein activating the silicon photomultiplier device includes applying a fixed voltage as the reverse bias input signal.

Embodiment 100 includes the features of embodiments 95-99, wherein determining the temperature of the silicon photomultiplier device includes: determining a gain of the silicon photomultiplier device when exposed to the predetermined light intensity; and determining the temperature of the silicon photomultiplier device according to the gain.

Embodiment 101 includes the features of embodiments 95-100, wherein determining the temperature includes determining a first temperature prior to exposing the silicon photomultiplier device to the light and determining a second temperature after exposing the silicon photomultiplier device to the light.

Embodiment 102 includes the features of embodiments 95-101, wherein the target object includes at least one sample contained in a sample well of a multi-well plate, the method further comprising: activating the sample well to cause an electrochemiluminescent reaction in the at least one sample to produce the light.

Embodiment 103 includes the features of embodiments 95-102, wherein the luminescent reaction includes a chemiluminescent reaction.

Embodiment 104 includes the features of embodiments 95-103, wherein the chemiluminescent reaction includes an electrochemiluminescent reaction.

Embodiment 105 includes the features of embodiments 95-103, wherein the target object includes at least one sample contained in a sample well of a multi-well plate, the method further comprising: determining an assay measurement according to the intensity of the light.

Embodiment 106 includes a non-transitory computer-readable medium configured with software instructions to cause execution of a method by at least one processor, the method comprising: a silicon photomultiplier device including a plurality of photo-avalanche diodes; at least one processor configured with software instructions for: activating the silicon photomultiplier device in a reverse bias mode by a reverse bias input signal; exposing the silicon photomultiplier device to a predetermined light intensity; measuring a reverse bias output signal from the silicon photomultiplier device; determining a gain of the silicon photomultiplier device according to the reverse bias input signal, the reverse bias output signal, and the predetermined light intensity when exposed to the predetermined light intensity; and determining the temperature of the silicon photomultiplier device according to the gain.

Embodiment 107 includes the features of embodiment 106, wherein activating the silicon photomultiplier device includes applying a fixed current as the reverse bias input signal.

Embodiment 108 includes the features of embodiments 106-107, wherein activating the silicon photomultiplier device includes applying a fixed voltage as the reverse bias input signal.

Embodiment 109 includes the features of embodiments 106-108, further comprising activating the silicon photomultiplier device in an operational reverse bias mode to obtain an assay measurement based on the temperature.

It will be readily apparent to one of ordinary skill in the relevant arts that other suitable modifications and adaptations to the methods and applications described herein can be made without departing from the scope of any of the embodiments. It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described. All publications, patents and patent applications mentioned in this specification are herein incorporated by reference to the same extent as if each individual publication, patent or patent application was specifically and individually indicated to be incorporated by reference.

The invention claimed is:

1. A system for obtaining temperature corrected photometric data, the system comprising:
a silicon photomultiplier device; and
at least one processor configured with software instructions for:
activating the silicon photomultiplier device in a forward bias mode by a forward bias mode input signal;
measuring, by the at least one processor, a forward bias mode response signal;
determining, by the at least one processor, a first temperature of the silicon photomultiplier device according to the forward bias mode input signal and the forward bias mode response signal;
determining, by the at least one processor, an operational reverse bias mode voltage;
activating the silicon photomultiplier device in an operational reverse bias mode by the operational reverse bias mode voltage;
exposing the silicon photomultiplier device to light from a target object;
determining a second temperature after exposing the silicon photomultiplier device to the light;
measuring an output signal from the silicon photomultiplier device; and
determining an intensity of the light according to the output signal and a silicon photomultiplier device gain.

2. The system of claim 1, wherein the at least one processor is further configured for determining the operational reverse bias mode voltage according to a temperature required to maintain a predetermined silicon photomultiplier device gain in the silicon photomultiplier device.

3. The system of claim 1, wherein the at least one processor is further configured for determining the silicon photomultiplier device gain according to the first temperature and the operational reverse bias mode voltage.

4. The system of claim 1, wherein activating the silicon photomultiplier device includes applying a fixed current as the forward bias mode input signal.

5. The system of claim 1, wherein activating the silicon photomultiplier device in the forward bias mode includes applying a fixed voltage as the forward bias mode input signal.

6. The system of claim 1, wherein the at least one processor is further configured for determining the first temperature of the silicon photomultiplier device by employing a correlation between a diode voltage and a diode current in the forward bias mode.

7. The system of claim 1, wherein the target object includes at least one sample contained in a sample well of a multi-well plate, the at least one processor being further configured for:
  activating the sample well to cause a luminescent reaction in the at least one sample to produce the light.

8. The system of claim 1, wherein the target object includes at least one sample contained in a sample well of a multi-well plate, the at least one processor being further configured for:
  determining an assay measurement according to the intensity of the light.

9. The system of claim 1 wherein the silicon photomultiplier device includes a plurality of photo-avalanche diodes.

10. A method for obtaining temperature corrected photometric data by a silicon photomultiplier device, the method comprising:
  activating the silicon photomultiplier device in a forward bias mode by a forward bias mode input signal;
  measuring, by at least one processor, a forward bias mode response signal;
  determining, by the at least one processor, a first temperature of the silicon photomultiplier device according to the forward bias mode input signal and the forward bias mode response signal;
  determining, by the at least one processor, an operational reverse bias mode voltage;
  activating the silicon photomultiplier device in an operational reverse bias mode by the operational reverse bias mode voltage;
  exposing the silicon photomultiplier device to light from a target object;
  determining a second temperature after exposing the silicon photomultiplier device to the light;
  measuring an output signal from the silicon photomultiplier device; and
  determining an intensity of the light according to the output signal and a silicon photomultiplier device gain.

11. The method of claim 10, further comprising determining the operational reverse bias mode voltage according to a temperature required to maintain a predetermined silicon photomultiplier device gain in the silicon photomultiplier device.

12. The method of claim 10, further comprising determining the silicon photomultiplier device gain according to the first temperature and the operational reverse bias mode voltage.

13. The method of claim 10, wherein activating the silicon photomultiplier device includes applying a fixed current as the forward bias mode input signal.

14. The method of claim 10, wherein activating the silicon photomultiplier device in the forward bias mode includes applying a fixed voltage as the forward bias mode input signal.

15. The method of claim 10, further comprising determining the first temperature of the silicon photomultiplier device by employing a correlation between a diode voltage and a diode current in the forward bias mode.

16. The method of claim 10, wherein the target object includes at least one sample contained in a sample well of a multi-well plate, the method further comprising:
  activating the sample well to cause a luminescent reaction in the at least one sample to produce the light.

17. The method of claim 10, wherein the target object includes at least one sample contained in a sample well of a multi-well plate, the method further comprising:
  determining an assay measurement according to the intensity of the light.

18. The method of claim 10, wherein the forward bias mode input signal is a first forward bias mode input signal and the forward bias mode response signal is a first forward bias mode response signal, the method further comprising:
  activating the silicon photomultiplier device in the forward bias mode by a second forward bias mode input signal;
  measuring, by at least one processor, a second forward bias mode response signal; and
  wherein determining the first temperature of the silicon photomultiplier device according to the forward bias mode input signal and the forward bias mode response signal includes determining the first temperature of the silicon photomultiplier device according to the first forward bias mode input signal, the first forward bias mode response signal, the second forward bias mode input signal, and the second forward bias mode response signal.

19. A non-transitory computer-readable medium configured with software instructions to cause execution of a method by at least one processor, the method comprising:
  activating a silicon photomultiplier device in a forward bias mode by a forward bias mode input signal;
  measuring, by at least one processor, a forward bias mode response signal;
  determining, by the at least one processor, a first temperature of the silicon photomultiplier device according to the forward bias mode input signal and the forward bias mode response signal;
  determining, by the at least one processor, an operational reverse bias mode voltage;
  activating the silicon photomultiplier device in an operational reverse bias mode by the operational reverse bias mode voltage;
  exposing the silicon photomultiplier device to light from a target object;
  determining a second temperature after exposing the silicon photomultiplier device to the light;
  measuring an output signal from the silicon photomultiplier device; and
  determining an intensity of the light according to the output signal and a silicon photomultiplier device gain.

20. The non-transitory computer-readable medium of claim 19, wherein the method further comprises determining the operational reverse bias mode voltage according to a temperature required to maintain a predetermined silicon photomultiplier device gain in the silicon photomultiplier device.

21. The non-transitory computer-readable medium of claim 19, wherein the method further comprises determining the silicon photomultiplier device gain according to the first temperature and the operational reverse bias mode voltage.

22. The non-transitory computer-readable medium of claim 19, wherein activating the silicon photomultiplier device includes applying a fixed current as the forward bias mode input signal.

23. The non-transitory computer-readable medium of claim 19, wherein activating the silicon photomultiplier device in the forward bias mode includes applying a fixed voltage as the forward bias mode input signal.

24. The non-transitory computer-readable medium of claim 19, wherein the method further comprises determining the first temperature of the silicon photomultiplier device by employing a correlation between a diode voltage and a diode current in the forward bias mode.

25. The non-transitory computer-readable medium of claim 19, wherein the target object includes at least one sample contained in a sample well of a multi-well plate, the method further comprising:
 activating the sample well to cause a luminescent reaction in the at least one sample to produce the light.

26. The non-transitory computer-readable medium of claim 19, wherein the target object includes at least one sample contained in a sample well of a multi-well plate, the method further comprising:
 determining an assay measurement according to the intensity of the light.

* * * * *